United States Patent [19]
Kaneko et al.

[11] Patent Number: 6,160,641
[45] Date of Patent: Dec. 12, 2000

[54] FOUR-PLANE REFLECTION TYPE REFLECTIVE OPTICAL UNIT AND SCANNER OPTICAL SYSTEM

[75] Inventors: Koji Kaneko; Makoto Utsugi, both of Omiya, Japan

[73] Assignee: Fuji Photo Optical Co., Ltd., Omiya, Japan

[21] Appl. No.: 08/995,201

[22] Filed: Dec. 19, 1997

[30] Foreign Application Priority Data

| Dec. 19, 1996 | [JP] | Japan | 8-340114 |
| Dec. 19, 1996 | [JP] | Japan | 8-340198 |
| Dec. 20, 1996 | [JP] | Japan | 8-340747 |
| Dec. 20, 1996 | [JP] | Japan | 8-341893 |
| Dec. 20, 1996 | [JP] | Japan | 8-342154 |
| Dec. 24, 1996 | [JP] | Japan | 8-343881 |

[51] Int. Cl.$^7$ .................................................. H04N 1/04
[52] U.S. Cl. ............................ 358/484; 358/474; 358/834
[58] Field of Search .................................... 358/474, 473, 358/475, 484; 250/208.1; 382/312, 313, 314; 359/834, 857, 831, 861, 129, 438, 496, 222

[56] References Cited

U.S. PATENT DOCUMENTS

| 2,409,407 | 10/1946 | Turner | 359/834 |
| 2,456,521 | 12/1948 | Maxwell | 359/834 |
| 2,466,455 | 4/1949 | Luboshez | 359/834 |
| 2,907,958 | 10/1959 | Skaggs | 359/834 |
| 2,999,414 | 9/1961 | Stamm et al. | 359/834 |
| 3,584,226 | 6/1971 | Lerner | 359/834 |
| 3,879,105 | 4/1975 | Broche et al. | 359/834 |
| 4,626,925 | 12/1986 | Toyoda | 358/473 |
| 5,084,773 | 1/1992 | Yonenaga | 358/473 |
| 5,453,850 | 9/1995 | Akuzawa et al. | 358/475 |
| 5,583,428 | 12/1996 | Meier | 359/834 |
| 5,686,720 | 11/1997 | Tullis | 358/473 |
| 5,845,019 | 12/1998 | Yoshizawa et al. | 382/312 |

*Primary Examiner*—Cheukfan Lee
*Attorney, Agent, or Firm*—Nixon Peabody LLP; David S. Safran

[57] ABSTRACT

A light source illuminates a manuscript, and a light from the manuscript enters a prism block through a slit. The prism block has two pairs of parallel reflective planes which are different in length, and a light from an incident plane is reflected at least once on each reflective plane and exits an outgoing plane. The light from the outgoing plane is conducted to a CCD via a lens so as to read information about an image on the manuscript.

23 Claims, 27 Drawing Sheets

F I G. 2
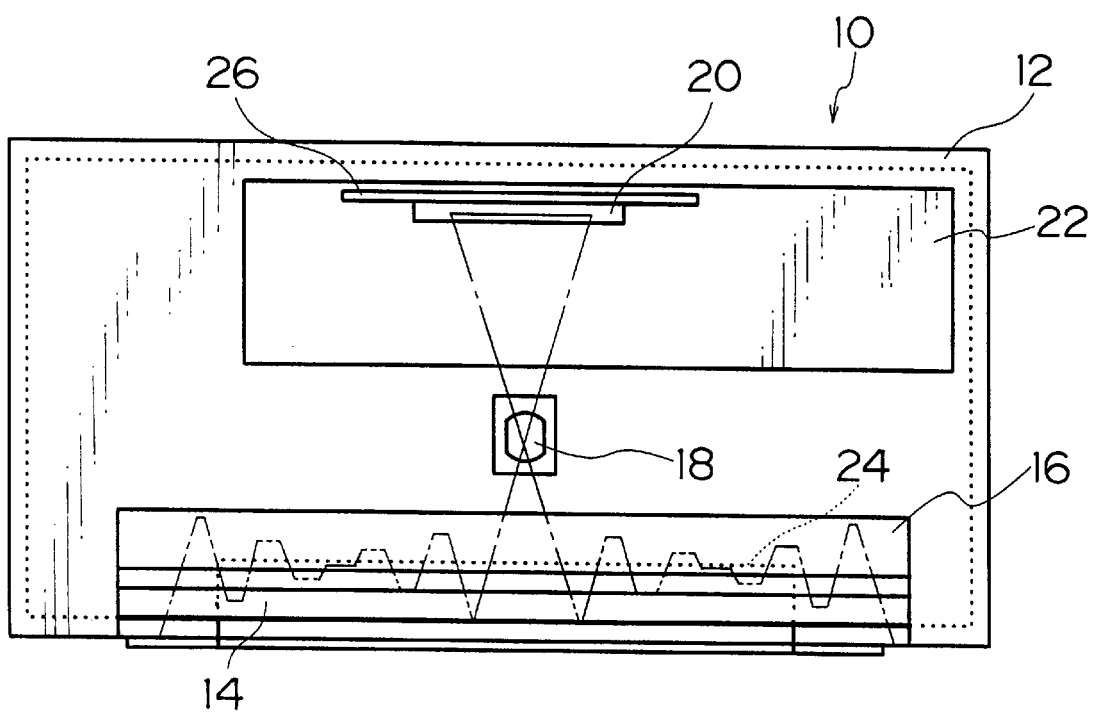

F I G. 3
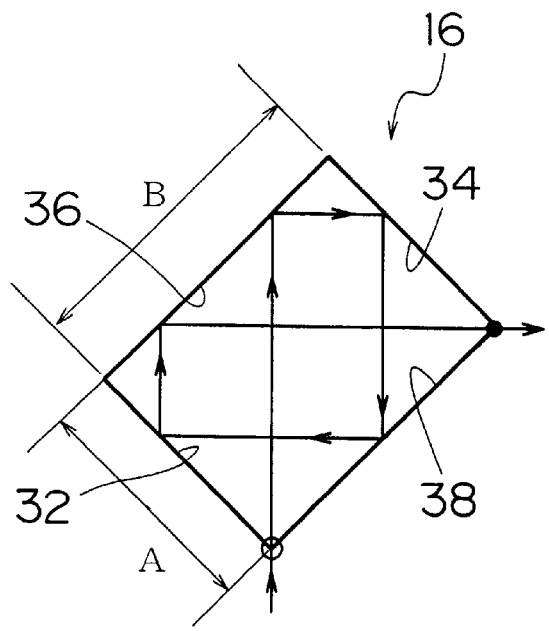
F I G. 4
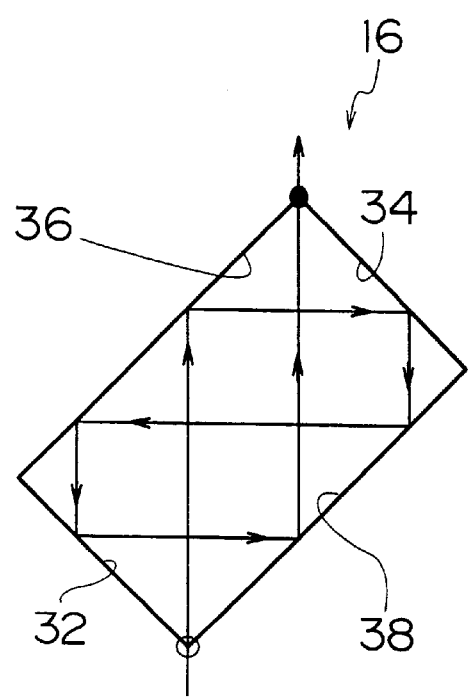

F I G. 5
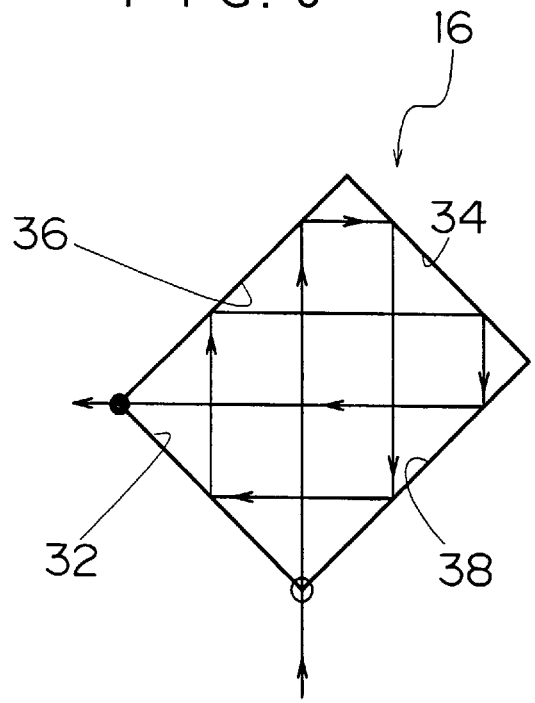
F I G. 6
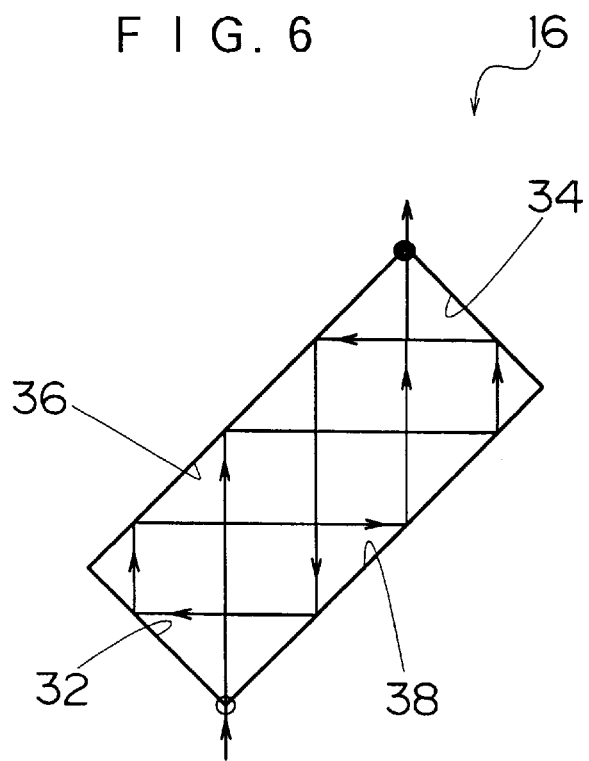

F I G. 9 (a)
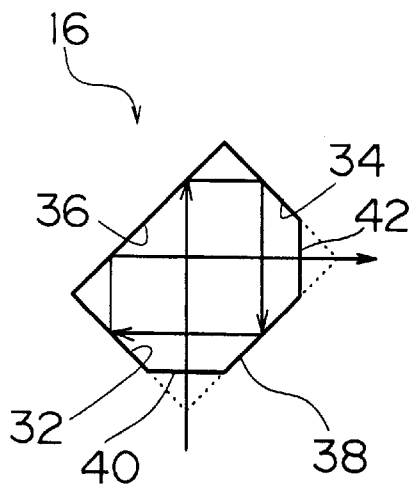
F I G. 9 (b)
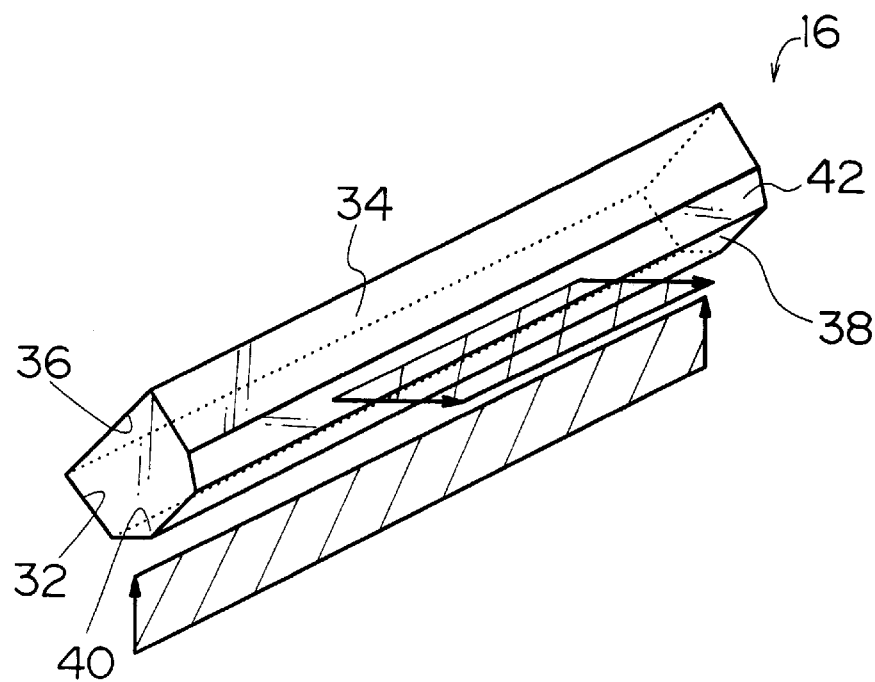

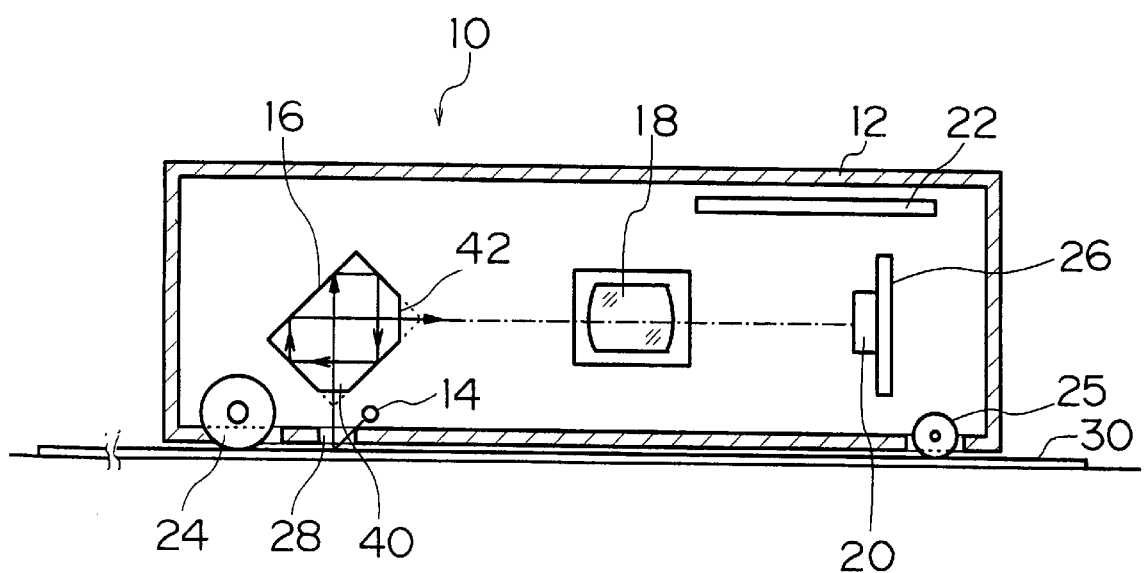
F I G. 1 4

F I G. 1 5 (a)
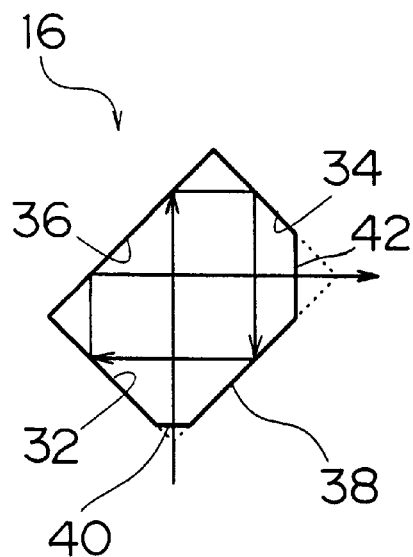
F I G. 1 5 (b)
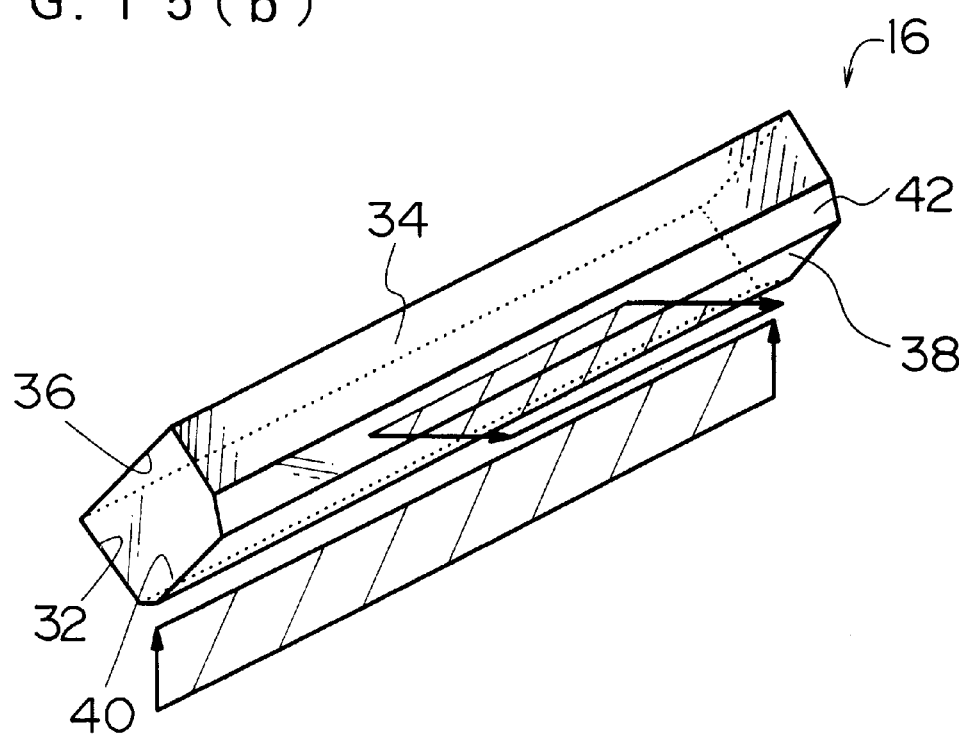

F I G. 1 6
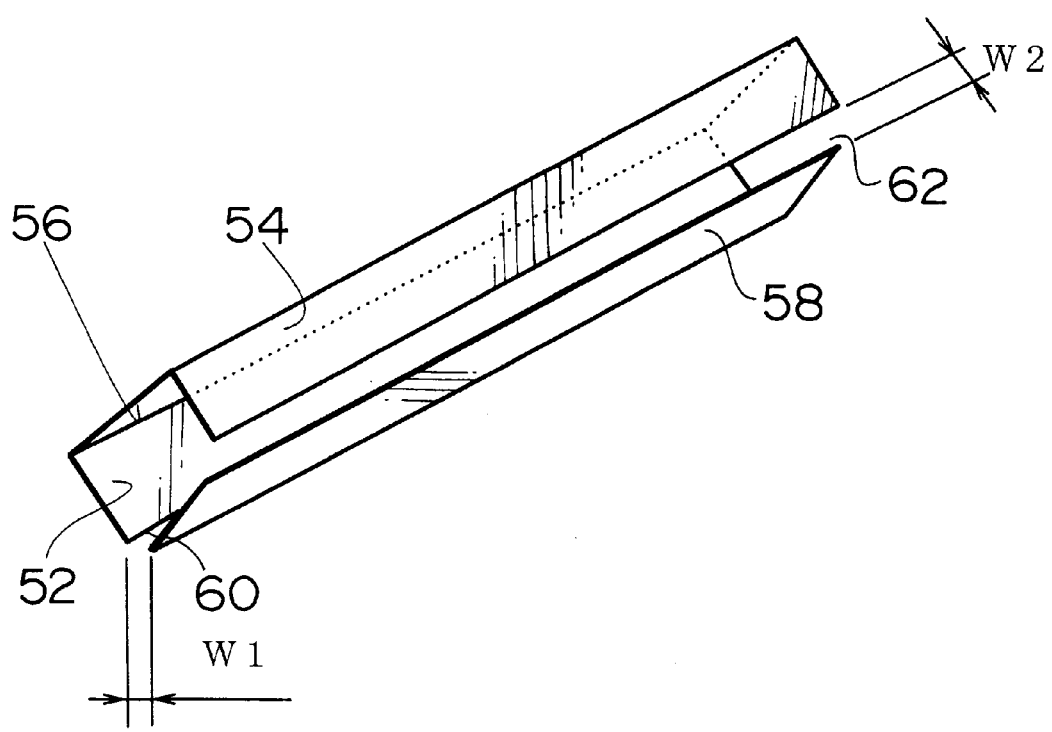

F I G. 1 9
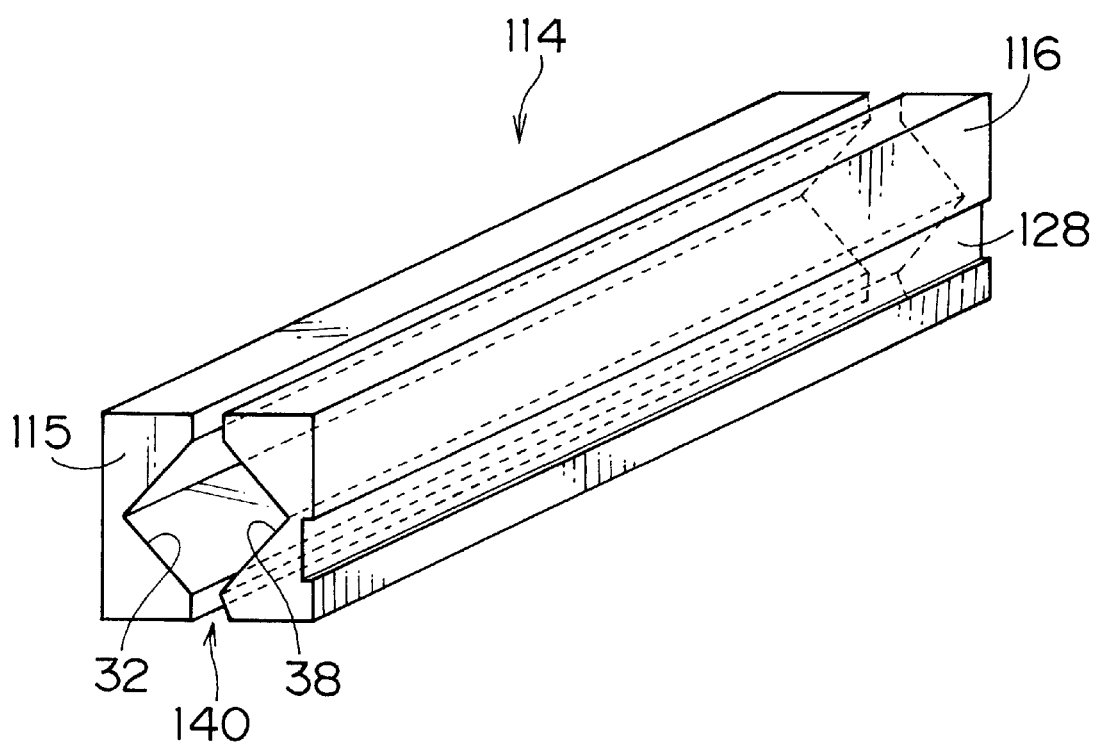

F I G. 3 2
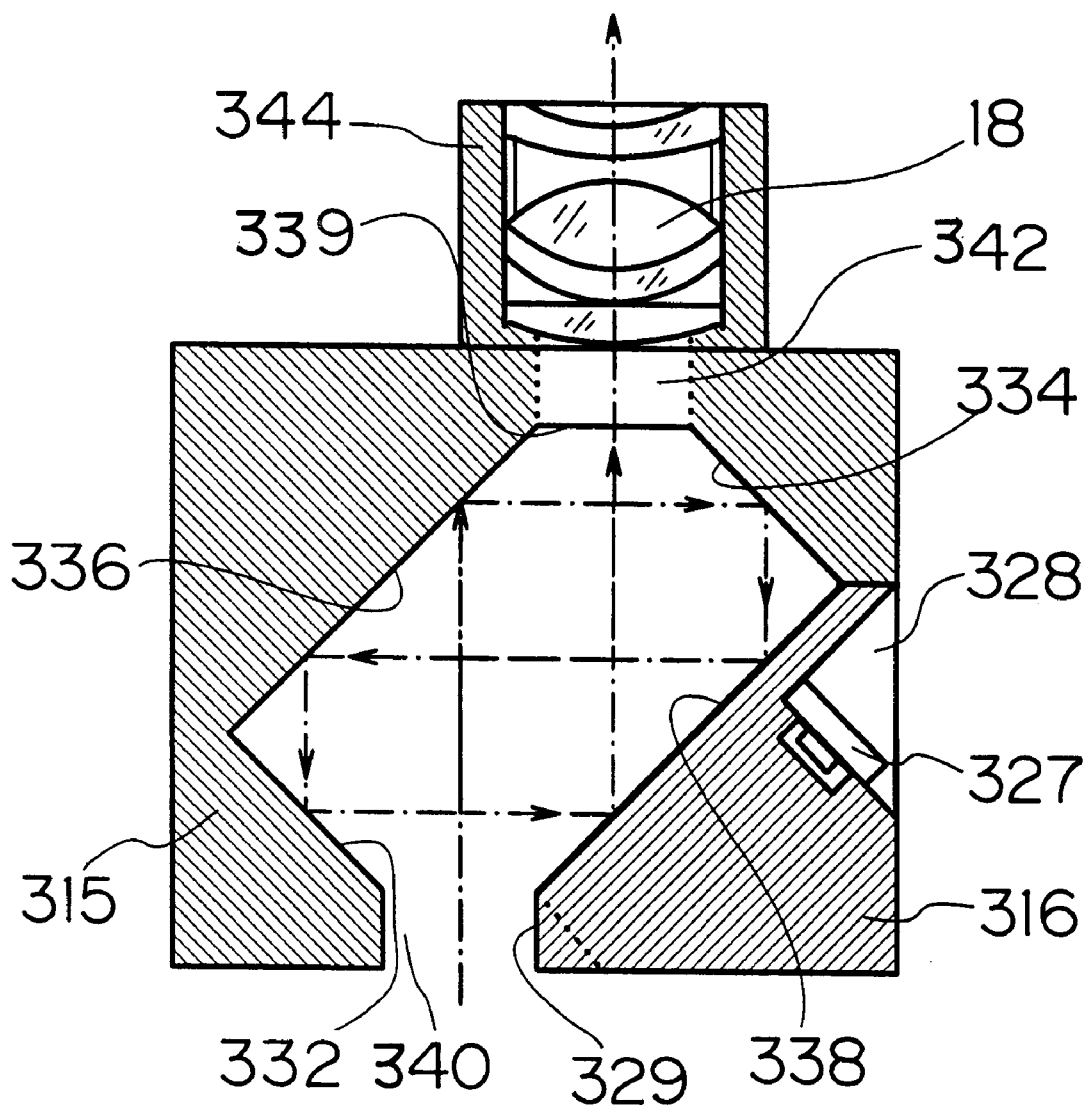

FOUR-PLANE REFLECTION TYPE REFLECTIVE OPTICAL UNIT AND SCANNER OPTICAL SYSTEM

BACKGROUND OF THE INVENTION

1. Field of the Invention

The present invention relates generally to a reflective optical unit and a scanner optical system, and more particularly to a reflective optical unit which forms an optical path and is arranged between an object and a lens to secure a conjugate length of a contracted optical system, and a scanner optical system which is suitable for a compact handy scanner used for reading information about an image on a manuscript, etc.

2. Description of Related Art

In a handy scanner which captures image information while moving along a manuscript and illuminating the manuscript with an illumination light source, a light which enters the scanner through a read opening (a slit) is conducted to a line sensor (CCD) via a lens. In order to secure a conjugate length, a plurality of turning mirrors are provided in a casing of the scanner.

In the above-mentioned conventional scanner optical system, the angle of mirrors, which are arranged to secure a necessary conjugate length, must be finely adjusted, and it is extremely difficult to arrange a plurality of mirrors at a proper angle. Moreover, if the number of turns is increased, the number of mirrors also increases, and thus, the scanner optical system cannot be compact.

Furthermore, in order for the scanner to read a clear image, the unevenness of luminance in a light source which illuminates a manuscript must be eliminated, and the manuscript must be efficiently illuminated. In the conventional scanner optical system, a reflective mirror, a lens and a CCD are supported by an independent support mechanism, and thus it is complicated to adjust an optical axis of each member.

SUMMARY OF THE INVENTION

The present invention has been developed in view of the above-described circumstances, and has as its object the provision of a compact reflective optical unit which forms an optical path and can easily be attached, and a scanner optical system which uses the reflective optical unit and is suitable for a compact handy scanner.

Another object of the present invention is to provide a reflective optical unit for forming an optical path, which can be easily attached and is compact, and a scanner optical system which uses the reflective optical unit and is suitable for a compact handy scanner.

Another object of the present invention is to provide a compact scanner optical system in which an illumination light source is compactly arranged to efficiently illuminate a manuscript, and a scanner optical system in which an optical axis is easily adjusted without finely adjusting the angle of the reflective planes.

To achieve the above-mentioned objects, a reflective optical unit of the present invention has two pairs of parallel planes which are different in length, and in the reflective optical unit light conducted into a medium area enclosed by the two pairs of parallel planes is reflected at least once on each of the parallel planes and then the light exits the medium area.

According to the present invention, the light, which is conducted into the medium area enclosed by two pairs of parallel planes which are different in length, is reflected at least once on each of the parallel planes, and then the light exits the medium area. Since The light is turned on four reflective planes, a relatively-long optical path can be formed.

Since the number of reflections is increased and decreased according to the length of two pairs of parallel planes, there is no necessity to provide a turning mirror even if a long optical path is required. Thereby, the reflective optical unit can be compact and easily attached.

The reflective optical unit is disposed between an object and a lens in the contracted optical system, so that the reflective optical unit can reflect the light from the object and conduct the light to the lens. Thus, a conjugate length specified by the lens can be secured.

The two pairs of parallel planes most preferably intersect at substantially a right angle, but they may also intersect at an angle of approximately 60° or 120°.

If the light enters an area in proximity to the first edge where two pairs of parallel planes intersect, and the light exits an area in proximity to the second edge, the reflective planes can be efficiently used, and it is convenient in view of design. For example, if the two pairs of parallel planes intersect at substantially a right angle, the outgoing ray is offset and exits in the same direction as the incident ray, or the outgoing ray exits in a direction perpendicular to the incident ray. Since the direction of the outgoing ray and the offset are determined according to the ratio of length between the two pairs of parallel planes, the reflective optical unit can easily be arranged in a variety of modes according to the arrangement of the lens.

The reflective plane which has two pairs of parallel planes may be formed by one or more prism blocks which are molded by transparent solid medium, and the reflective plane may also be formed by a plurality of optical mirrors.

If the reflective plane is formed by one or more prism blocks, it is preferable to form an incident and outgoing plane, which is substantially vertical to the incident and outgoing rays, at least one of the area in proximity to the first edge the light enters and the area in proximity to the second edge the light exits, so as to prevent the reflection and diffusion of the light at the apex of the edge. The incident and outgoing plane must be formed in such a size as not to obstruct the reflection on each reflective plane.

On the other hand, if the reflective planes are formed by a plurality of optical mirrors, an opening is respectively formed in the area in proximity to the first edge the light enters and the area in proximity to the second edge that the light exits. The opening must be formed in such a size as to have no effect on reflection on each of the parallel planes.

To achieve the above-mentioned objects, a scanner optical system of the present invention is moved along a manuscript and conducts light from the manuscript to a line sensor via a lens and reads information about an image on the manuscript by means of the line sensor, and comprises two pairs of parallel planes which are different in length; and in the scanner optical system, a light conducted from the manuscript into a medium area enclosed by the two pairs of parallel planes is reflected at least once on each of the parallel planes and the light exits the medium area and is conducted to the lens.

The present invention is characterized in that the above-mentioned four-plane reflection type reflective optical unit is applied to the scanner optical system. Thus, it is unnecessary or easy to adjust the angle of the reflective planes, and the reflective optical unit can be compact.

Furthermore, to achieve the above-mentioned objects, a scanner of the present invention is moved along a manuscript while illuminating the manuscript with an illumination light source, and conducts light from the manuscript to a line sensor, and reads information about an image on the manuscript, and the scanner comprises: a reflective optical member which has two pairs of parallel planes which are different in length, and in which a light entering a medium area enclosed by the two pairs of parallel planes is reflected at least once on each of the parallel planes and the light exits the reflective optical member toward the lens so as to form an optical path; and a moving position detecting means for detecting a relative moving amount of the scanner and the manuscript; and in the scanner, the reflective member is inclined with respect to an optical axis of an incident light from the manuscript, and the illumination light source and the moving position detecting means are arranged across the optical axis of the incident light from the manuscript and in a space between a bottom face of the reflective optical member and the manuscript.

According to the present invention, the light enters the reflective optical member in which two pairs of parallel planes which are different in length, and the light is reflected at least once on each of the parallel planes and exits the reflective optical member. Since the route of light is turned on four reflective planes at the inside of the reflective optical member, a relatively-long optical path can be formed. By using the reflective optical member which is constructed in the above-mentioned manner, it is unnecessary or easy to finely adjust the angle of the reflective planes, and the scanner can be more compact.

The reflective optical member consists of a pair of parallel reflective planes at the short side and a pair of parallel reflective planes at the long side. If the reflective optical member is inclined with respect to the incident optical axis of the light from the manuscript, a space specified by the bottom of the reflective optical member and the manuscript is formed below the reflective optical member. Since an illumination light source and a moving position detecting means are arranged at both sides of the incident optical axis in the space, the light source can be relatively close to the moving position detecting means, and thus the scanner can be compact and slim. For example, in the case of the square optical member in which two pairs of parallel planes which are different in length, intersect at a right angle, reflective optical member is inclined at an angle of approximately 30° or 45° with respect to the incident optical axis of the light from the manuscript.

Because the moving position detecting means ordinarily occupies a larger space than the illumination light source, the illumination light source is arranged below the reflective plane at the short side, and the moving position detecting means is arranged below the reflective plane at the long side so that the scanner can be more compact.

Furthermore, to achieve the above-mentioned object, a reflective optical unit of the present invention has two pairs of parallel planes of different length and in which a light conducted into a medium area enclosed by the two pairs of parallel planes is reflected at least once on each of the parallel planes and then the light exits the medium area, and in the reflective optical unit, an incident part for capturing the light into the reflective optical unit is narrower than an outgoing part through which the light exits the reflective optical unit.

According to the present invention, since the incident opening is narrower than the outgoing opening, it is possible to prevent the unnecessary light from entering the reflective optical unit and obtain a proper quantity of the outgoing light according to the width of the outgoing opening.

The reflective plane which has two pairs of parallel planes may be formed by either one or more prism blocks or a plurality of optical mirrors. If the reflective plane is formed by one or more prism blocks, an incident plane which is substantially vertical to an incident ray is formed in the area in proximity to the first edge where the two pair of parallel planes intersect, and an incident plane which is substantially vertical to the incident ray is formed in the area in proximity to the second edge where the two pair of parallel planes intersect. On the other hand, if the reflective plane is formed by a plurality of optical mirrors, an incident opening is formed in the area in proximity to the second edge the light enters, and an outgoing opening is formed in the area in proximity to the second edge where the two pairs of parallel planes intersect. The width of the incident plane or opening is smaller than that of the outgoing plane or opening.

To achieve the above-mentioned object, a scanner optical system has a reflective optical unit provided with reflective planes composing two pairs of parallel planes, which are different in length, and a light from a manuscript illuminated by a light source is reflected at least once on each of the parallel planes to secure a required conjugate length, and the light is conducted from the reflective optical unit to a line sensor via a lens so as to read information about an image on the manuscript, and in the scanner optical system, an incident part for light to enter the reflective optical unit is narrower than an outgoing part through which the light exits the reflective optical unit.

The present invention is characterized in that the above-described reflective optical unit is applied to the scanner optical system. Thus, it becomes unnecessary to adjust the angle of the reflective planes, or even if necessary, it is easy to adjust the angle of the reflective planes, and the scanner optical system can be more compact. Moreover, the sufficient quantity of light can be secured, and the resolution can be improved.

To achieve the above-mentioned objects, the scanner optical system of the present invention comprises: a first optical block in which there is formed a first reflective plane and a second reflective plane, which are different in length, among four reflective planes constructing the two pairs of parallel planes which are different in length; a second optical block in which there is formed a third reflective plane and a second reflective plane, which are different in length, among four reflective planes constructing the two pairs of parallel planes which are different in length; and in the scanner optical system, the first and second optical blocks are arranged in such a way that reflective planes of the same length face one another, and a light source mounting part is formed in at least one of the first and second optical blocks.

According to the present invention, at least one of reflective planes constructing the parallel planes in the four-reflection type reflective optical unit is formed by one or more optical blocks made of transparent optical material, and a light source mounting part is formed in the optical block. Thus, the illumination light source can compactly be attached to the optical block.

The optical block functions as the above-mentioned reflective plane, and also functions as the light guide member which conducts the light from the light source to the manuscript. The illumination light can be efficiently irradiated to the manuscript.

In particular, in the light source mounting part, a concave lens is formed on a plane facing the light emitting part, and it is possible to diffuse the light from the light source due to the operation of the concave lens and prevent the unevenness of the luminance in illumination.

The outgoing plane that the light for illuminating the manuscript exits is formed to be a cylindrical convex, so that the light from the light emitting part can be more efficiently illuminated toward the manuscript, etc.

According to another mode of the present invention, the parallel planes may be constructed by two optical blocks. That is, the reflective optical unit is provided with the first optical block in which there is formed the first and second reflective planes, which are different in length, among four reflective planes constructing the two pairs of parallel planes which are different in length, and the second optical block in which there is formed the third and fourth reflective planes, which are different in length, among four reflective planes constructing the two pairs of parallel planes which are different in length. Both blocks are arranged in such a way that planes of the same length face one another, and a light source mounting part is formed in at least one of the first and second reflective planes.

Thereby, it is unnecessary or easy to adjust the angle of the reflective planes constructed by the parallel planes.

In particular, the light source mounting part is formed in the first and second optical blocks, and the light source which illuminates the manuscript is provided in each light source mounting part. The illumination light is irradiated from the right and left, thereby preventing the shade resulting from the unevenness on the manuscript.

The first and second optical blocks have the same shape if rotated, and they can be manufactured from one model. Thus, the manufacturing cost can be significantly lowered.

Furthermore, a reflective optical unit of the present invention comprises a plurality of four-plane reflective optical systems which are constructed in such a way that a luminous flux entering an area enclosed by two pairs of parallel planes is reflected at least once on each of the parallel planes and then the light exits.

In other words, the four-plane reflective optical system composed of two pairs of parallel planes can increase and decrease the number of reflections by varying the ratio of length between the two pairs of parallel planes, and can form a relatively-long optical path in the area enclosed by the parallel planes. By providing a plurality of four-plane reflective optical systems, a long optical path can be formed without increasing the size of the four-plane reflective optical system. The reflective optical unit can be slimmer than in the case where it is constructed by one four-plane reflective optical system.

According to the present invention, the optical system can be compact without providing the turning mirror, etc. even if a long optical path is required.

By arranging two optical blocks with the reflective planes in such a way as to face one another, the optical blocks have the same shape if a plurality of four-plane reflective optical systems are formed. In this case, the two blocks can be manufactured from one model.

Furthermore, one four-plane reflective optical system or a plurality of four-plane reflective optical systems are determined as being basic units, and each basic unit is modularized so that a plurality of basic units can be combined. The number of parts can be reduced as a result.

To achieve the above-mentioned objects, a scanner optical system of the present invention conducts a light from a manuscript illuminated by a light source to image pickup means via a lens, and the scanner optical system comprises: a reflective optical unit composed of a plurality of four-plane reflective optical systems constructed in such a way that a luminous flux entering an area enclosed by two pairs of parallel planes is reflected at least once on each of the parallel planes and then the light exits, and in the scanner optical system, a light is conducted from the object to the lens via the reflective optical unit.

The present invention is characterized in that the above-mentioned reflective optical unit is applied to the scanner optical system. Thus, it is unnecessary or easy to adjust the angle of the reflective planes, and the optical axis can easily be adjusted. Moreover, the scanner optical system can be more compact and slimmer.

To achieve the above-mentioned objects, a scanner optical system of the present invention is provided with a reflective optical unit which has two pairs of parallel planes, and a light from a manuscript illuminated by a light source is reflected at least once on each of the parallel planes and then the light exits, and the light is conducted from the reflective optical unit to image pickup means via a lens, and in the scanner optical system, at least one of reflective planes constructing the parallel planes is formed by one or more optical blocks made of transparent optical material, and a lens support member for supporting the lens is integrated with the optical block.

According to the present invention, at least one of reflective planes composing the parallel planes is formed by one or more optical blocks made of transparent optical material, and the lens supporting part is integrated with the optical block. Thus, the optical axis can easily be adjusted, and the lens can be compactly attached to the optical block. Thereby, the scanner optical system can be more compact.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a front perspective diagram of the scanner in FIG. 1;

FIG. 3 is a view for explaining a route of reflection in a four-plane reflection type reflective optical system composed of two pairs of parallel planes;

FIG. 4 is a view for explaining a route of reflection in a four-plane reflection type reflective optical system composed of two pairs of parallel planes;

FIG. 5 is a view for explaining a route of reflection in a four-plane reflection type reflective optical system composed of two pairs of parallel planes;

FIG. 6 is a view for explaining a route of reflection in a four-plane reflection type reflective optical system composed of two pairs of parallel planes;

FIG. 7(a) is a model view of the optical system, and FIG. 7(b) is a view showing the exterior of a prism block;

FIGS. 9(a) and 9(b) are views illustrating an example of a route of reflection in a four-plane reflection type reflective optical system which an incident ray from below exits to the right (horizontally), and FIG. 9(a) is a model view of the optical system, and FIG. 9(b) is a view showing the exterior of a prism block;

FIG. 13(a) is a model view of the optical system, and FIG. 13(b) is a view showing the exterior of a prism block;

FIG. 14 is a side sectional view of the handy scanner according to the fourth embodiment of the present invention;

FIGS. 15(a) and 15(b) are views illustrating an example of a route of reflection in a four-plane reflection optical system which an incident ray from below exits to the right (horizontally), and FIG. 15(a) is a view illustrating a model of the optical system and FIG. 15(b) is a perspective view illustrating the exterior of a prism block;

FIG. 16 is a perspective view illustrating an example of the reflective optical unit which an incident ray from below exits to the right (horizontally);

FIG. 19 is a perspective view of optical blocks constructing the reflective optical unit in FIG. 18;

FIG. 32 is an enlarged sectional view illustrating the reflective optical unit in FIG. 30.

DETAILED DESCRIPTION OF THE PREFERRED EMBODIMENTS

This invention will hereunder be given of the preferred embodiments with reference to the accompanying drawings.

Figure 1:
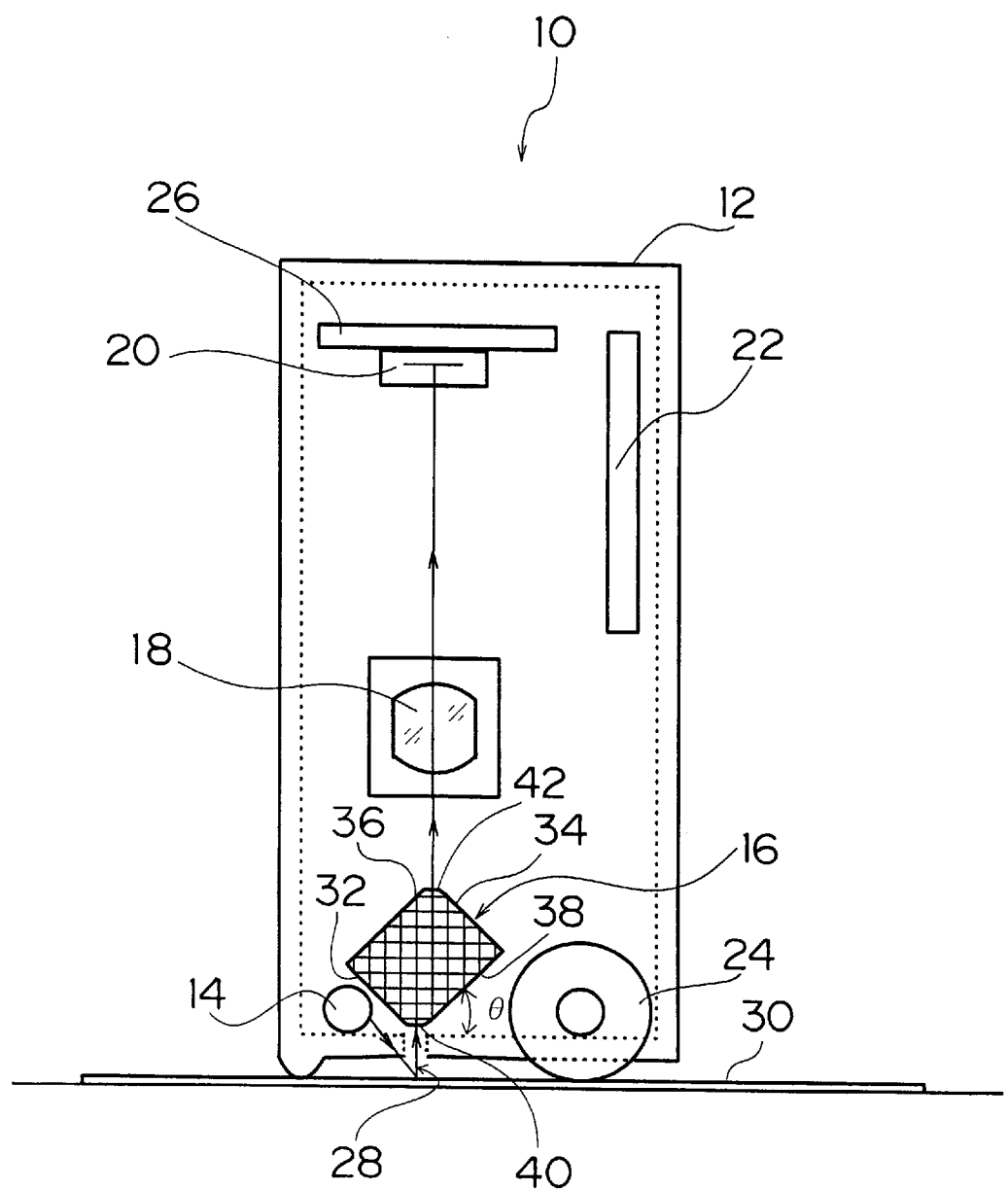
FIG. 1 is a side perspective diagram of a handy scanner according to the present invention.

FIG. 1 is a perspective side view of a handy scanner to which a reflective optical unit of the present invention is applied, and FIG. 2 is a front perspective diagram thereof.

A scanner 10 is constructed in such a way that a light source 14 for illumination, a prism block (equivalent to a reflective optical unit) 16, a lens 18, a line sensor (CCD) 20, a scanner circuit 22, a position detecting roller 24, etc. are arranged in a casing 12. Reference numeral 26 is a CCD circuit board.

The light source 14 is disposed at the bottom of the casing 12, and the prism block 16 is located on the right side of the light source 14. A slit 28 is formed at the bottom of the casing 12 and just above the prism block 16, and the light source 14 irradiates the manuscript 30 through the slit 28. The light from the manuscript 30 is captured into the casing 12.

The prism block 16 is made of transparent optical plastic or glass, and the section thereof is substantially rectangular. The prism block has a pair of parallel reflective planes 32, 34 of the length A and a pair of parallel reflective planes 36, 38 of the length B (>A). The prism block 16 is supported by a support member (not shown) so that the lower reflective planes 36, 38 can be inclined at an angle of θ=45° with respect to the manuscript 30.

The light source 14 and the roller 24 are arranged in a space which is formed between the lower reflective planes 32, 38 of the prism block 16 and the bottom of the casing 12. There is an incident optical axis of the light from the manuscript 30 between the light source 14 and the roller 24. Thus, the scanner can be slim (in the horizontal direction in FIG. 1) because the light source 14 can be close to the roller 24.

An incident plane 40, which is substantially parallel to the manuscript 30, is formed in proximity to an edge where the lower reflective planes 32, 38 of the prism block 16 intersect. Likewise, an outgoing plane 42, which is parallel to the manuscript 30, is formed in proximity to an edge which is formed by the upper reflective planes 34, 36. The incident plane 40 and the outgoing plane 42 are formed so as not to interfere with the reflection on the reflective planes 32, 38, 34, 36.

As stated above, the planes (the incident plane 40 and the outgoing plane 42) are formed vertically to the incident and outgoing rays to thereby prevent the reflection and diffusion of the light at the edge. If the outgoing plane 42 is narrow, the quantity of light on a sagittal plane, and thus, the resolution is lowered. For this reason, the width of the outgoing plane 42 is determined in a manner to obtain the sufficient quantity of light on the sagittal plane.

The light enters the casing 12 from the manuscript 30 through the slit 28, and enters the prism block 16 from the incident plane 40. Then, the light is reflected on the reflective plane 36 to the right at a right angle. The light is reflected on the reflective planes 34, 38, 32, . . . , and it finally exits the prism block 16 through the outgoing plane 42.

The lens 18 and the CCD 20 are disposed above the prism block 16, and the light which exits the prism block 16 is formed on the CCD 20 via the lens 18. The light which enters a light accepting surface of the CCD 20 is transformed into an electric signal in accordance with the intensity of the light. The electric signal is conducted to the scanner circuit 22. An image signal processing means of the scanner circuit 22 obtains information about the image on the manuscript 30.

The roller 24 is provided with a means (not shown) such as an encoder which detects the number of revolutions, so that the roller 24 can detect the position to which the scanner 10 moves and the amount of movement thereof.

A description will hereunder be given of the operation of the handy scanner to which the reflective optical unit of the present invention is applied.

First, an explanation will be given of the reflective operation of a four-plane reflective optical system which is composed of two pairs of parallel planes (reference numerals 32, 34, 36, 38). FIGS. 3–6 describe the prism block 16 which is geometrically modeled. The reflective optical system has a pair of parallel reflective planes 32, 34 of the length A and a pair of parallel reflective planes 36, 38 of the length B (>A), and these two pairs of the parallel planes are perpendicular to one another. A reflective optical path will be explained in relation to the ratio of the length (A:B) in the case where the light enters the reflective optical system from the lowest apex (an incident point) indicated by a white circle.

FIG. 3 shows the state of A:B=3:4. The light enters the prism block 16 upward from the incident point indicated by a white circle in FIG. 3, and the light is reflected on the reflective plane 36 (hereinafter referred to as the first reflective plane) to the right at a right angle. Thereafter, the light is sequentially reflected on the reflective plane 34 (hereinafter referred to as the second reflective plane), the reflective plane 38 (hereinafter referred to as the third reflective plane), and the reflective plane 32 (hereinafter referred to as the fourth reflective plane.) The light is finally reflected again on the first reflective plane 36, and the light exits the prism block 16 from an apex (an outgoing point) at the right end indicated by a black circle in FIG. 3. In this case, the total number of reflections is five, and the optical path length is $4 \times 2^{1/2} \times A$.

FIG. 4 shows the state of A:B=3:5. The light which enters the prism block 16 up from the incident point indicated by a white circle in FIG. 4 is reflected on the first reflective plane 36 to the right at a right angle. Thereafter, the light is sequentially reflected on the second reflective plane 34, the third reflective plane 38, the first reflective plane 36, the fourth reflective plane 32, and the third reflective plane 38. The light exits the prism block 16 from an upper apex (an outgoing point) indicated by a black circle in FIG. 4. In this case, the total number of rotations is six, and the optical path length is $5 \times 2^{1/2} \times A$.

FIG. 5 shows the state of A:B=4:5. The light enters the prism block 16 upward from an incident point indicated by a white circle, and the light is reflected on the first reflective plane 36 to the right at a right angle. Thereafter, the light is sequentially reflected on the second reflective plane 34, the third reflective plane 38, the fourth reflective plane 32, the first reflective plane 36, the second reflective plane 34, and the third reflective plane 38. The light exits the prism block 16 from a left apex indicated by a black circle in FIG. 5. In this case, the total number of reflections is seven, and the optical path length is $5 \times 2^{1/2} \times A$.

FIG. 6 shows the state of A:B=3:7. The light enters the prism block 16 upward from an incident point indicated by a white circle in the drawing, and the light is reflected at least once on each reflective plane. After eight reflections, the light exits the prism block 16 from an outgoing point indicated by a black circle in the drawing. In this case, the optical path length is $7 \times 2^{1/2} \times A$.

As stated above, by changing the ratio of A:B, the reflection route and the number of reflections can be changed, and the outgoing direction can be vertically and horizontally changed. In addition, the optical path length can be changed appropriately. The ratio is determined in accordance with the optical path length, which is required based on the conjugate length specified by the lens 18, and the arrangement of the slit 28, the lens 18 and the CCD 20.

Figure 7A:
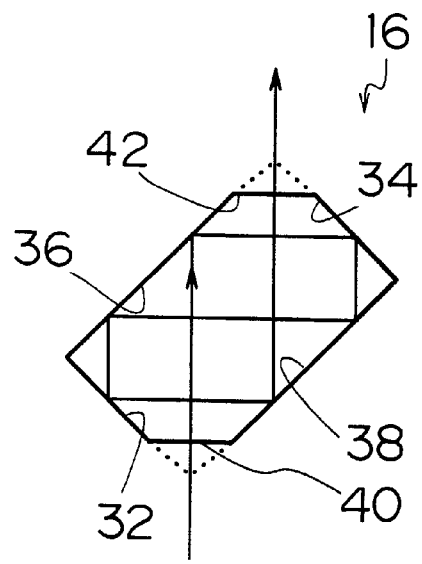
FIGS. 7(a) and 7(b) are views showing an example of a route of reflection in a four-plane reflection type reflective optical system in which an incident light from below exits upward.
Figure 7B:
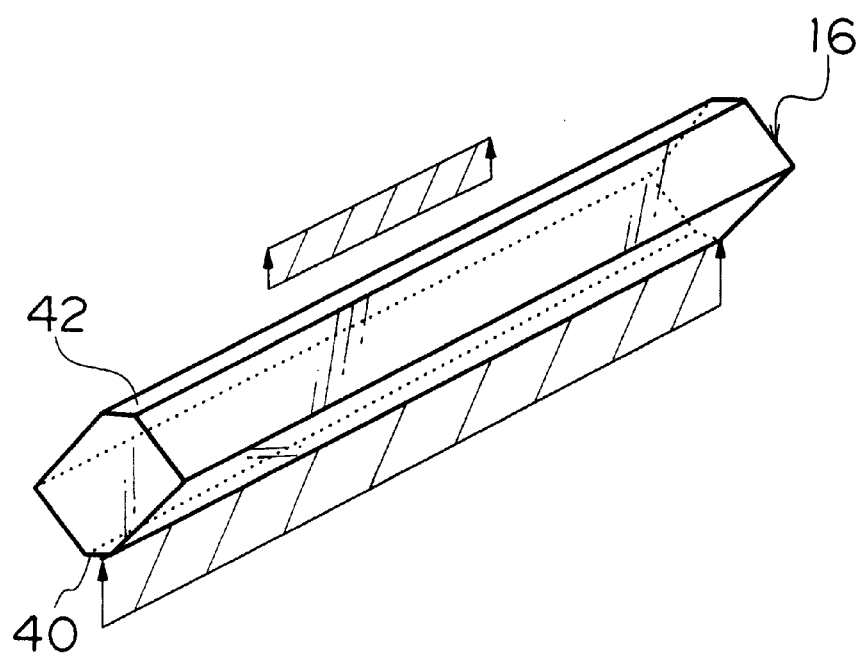

As shown in FIG. 1, in the vertical scanner in which the slit 28, the lens 18 and the CCD 20 are arranged in substantially a straight line, the incident ray is parallel to the outgoing ray as shown in FIGS. 7(*a*) and 7(*b*). The scanner 10 in FIG. 1 uses the prism block 16 of A:B=9:11 (the total number of reflections is eighteen, and the optical path length is $11 \times 2^{1/2} \times A$.)

According to the above-described construction, the number of reflections can be increased and decreased in accordance with the ratio (A:B) in the length of two pairs of parallel reflective planes. A relatively long optical path can be formed without adding a conventional turning mirror. Thereby, there is no necessity to finely adjust the angle of the mirror, and the mirror can be more compact.

Figure 10:
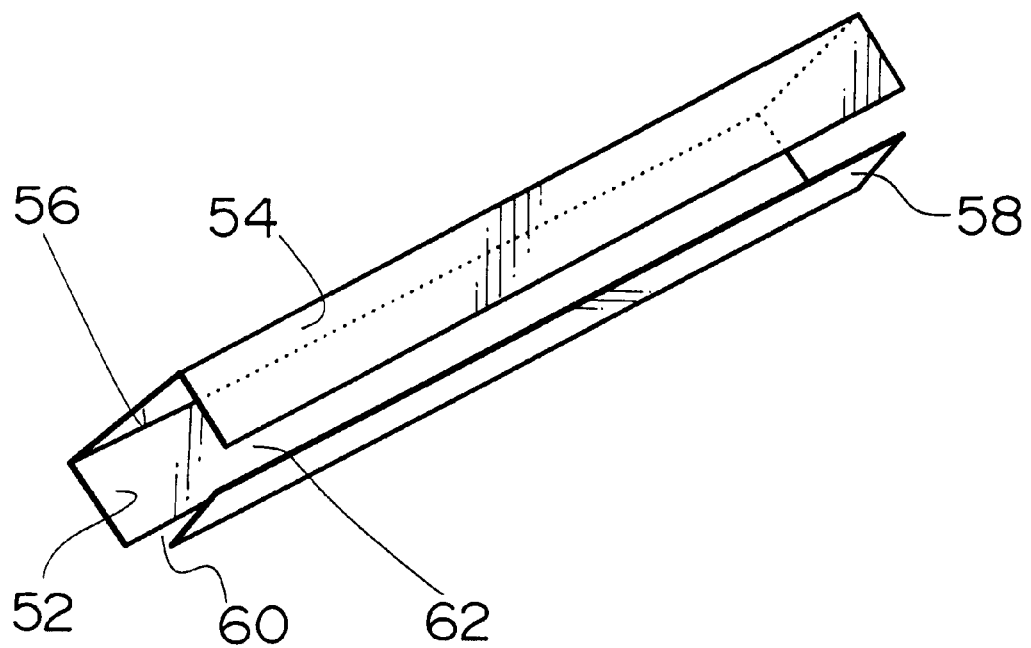
FIG. 10 is a perspective diagram illustrating another example of the reflective optical unit which an incident ray from below exits to the right (horizontally)

If the scanner 10 in FIG. 10 is moved in one direction along the manuscript 30 (to the right or left in FIG. 1), the roller 24 rotates in contact with the manuscript 30, and the scanner 10 smoothly move with a distance between the scanner 10 and the manuscript 30 being fixed. Then, while the position of the scanner 10 is detected based on the rotation of the roller 24, the light is conducted to the CCD 20 from the manuscript 30 to the above-mentioned prism block 16 and the lens 20. Thereby, the information about the image on the manuscript 30 can be obtained.

Figure 8:
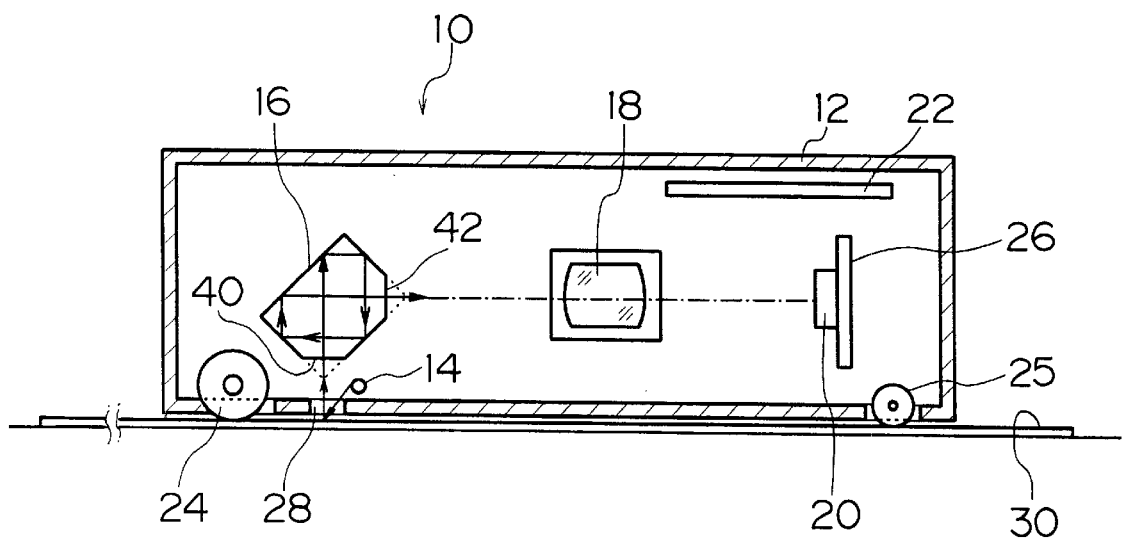
FIG. 8 is a side view illustrating a handy scanner according to the second embodiment of the present invention.

FIG. 8 illustrates the second embodiment of the present invention. In FIG. 8, parts similar to those described in the first embodiment shown in FIG. 1 are denoted by the same reference numerals, and a description of them will be omitted. The scanner 10 in FIG. 8 is constructed in such a way that the optical axis between the lens 18 and the CCD 20 is substantially parallel to the manuscript 30. The prism block 16 reflects the light through the slit 28, and the light exits to the right. Reference numeral 25 is an auxiliary roller.

The prism block 16 is supported by a support member (not shown) in such a way that the lower reflective planes 32, 38 can be at an angle of θ=45° with respect to the optical axis of the incident and outgoing rays. The light source 14 and the roller 24 are arranged in a space which is formed between the reflective planes 32, 38 and the inner bottom face of the casing 12. The optical axis of the incident ray is located between the light source 14 and the roller 24.

According to the arrangement, the scanner can be compact in a horizontal direction in FIG. 8 because the light source 14 can be close to the roller 24.

The horizontal scanner 10 uses the prism block 16 in which the outgoing ray exits in a direction perpendicular to the incident ray as shown in FIGS. 9(*a*) and 9(*b*). This scanner 10 operates in the same manner as the scanner described with reference to FIG. 1, and a description will be omitted.

In the first and second embodiments, the lower reflective planes 32, 38 are inclined at an angle of θ=45° with respect to the optical axis of the incident and outgoing rays. The reflective planes 32, 38 may also be inclined at an angle of 30° and 60°.

Moreover, in the first and second embodiments, the prism block 16 was explained but the four-plane reflex optical system may be formed by combining a plurality of optical mirrors. That is, the reflective planes may be composed of any member if the light conducted to an area which is occupied by medium (plastic, glass, air, etc.) enclosed by two pairs of the parallel reflective planes is reflected on the four reflective planes at least once, and the light exits the medium area.

For example, a reflective optical unit, which is equivalent to the prism block 16 in FIG. 9, may be formed by combining four plate-like mirrors 52, 54, 56, 58. In this case, a gap (an opening) is formed on a line where the mirror 52 (equivalent to the fourth reflective plane 32 in FIG. 9) intersects the mirror 58 (equivalent to the third reflective plane 38 in FIG. 9), thereby forming an incident opening which is equivalent to the previously-mentioned incident plane 40. A gap (an opening) 62 is formed on a line where the mirror 54 (equivalent to the second reflective plane 34 in FIG. 9) intersects the mirror 58, thereby forming an outgoing opening which is equivalent to the previously-mentioned outgoing plane 42.

Figure 11:
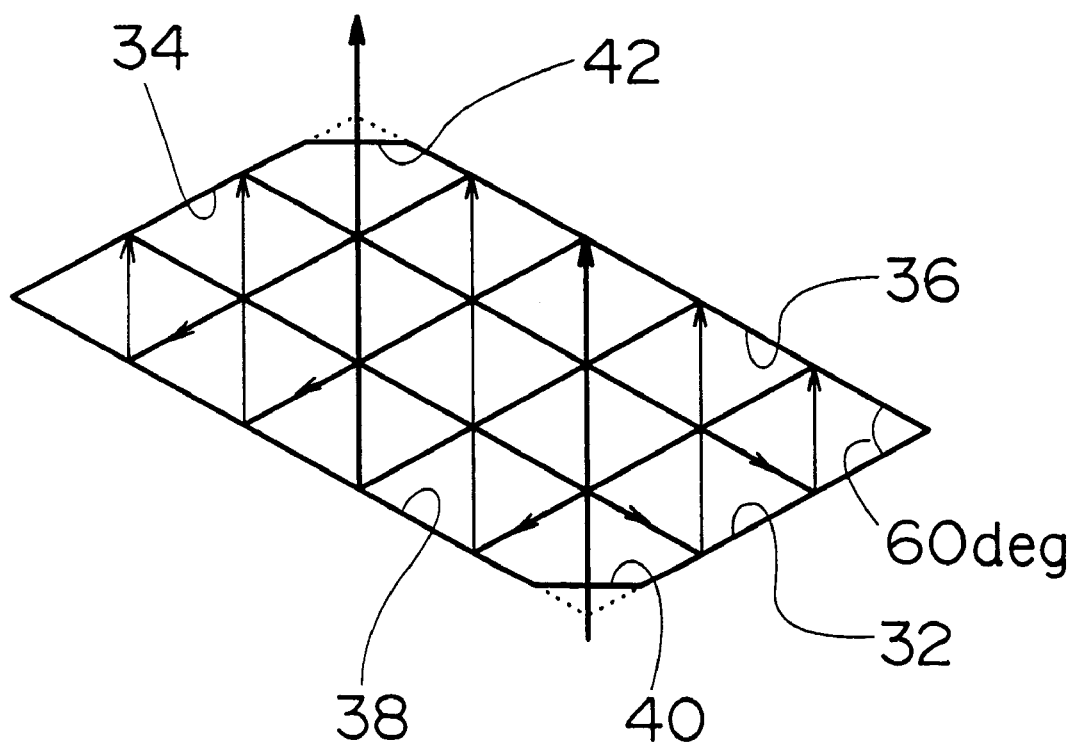
FIG. 11 is a view for explaining a route of reflection in the case where two pairs of parallel reflective planes intersect at an angle of 60° or 120°.

In the first and second embodiments, two pairs of the parallel reflective planes intersect at a right angle, but the present invention should not be restricted to this. As shown in FIG. 11, two pairs of the parallel reflective planes may intersect at an angle of 60° or 120°.

In this case, the incident plane 40, which is substantially vertical to the incident ray, is formed at one edge of a 120° angle, and the outgoing plane, which is substantially vertical to the outgoing ray, is formed at the other edge of a 120° angle. The lower reflective planes 32, 38 are inclined at an angle of 60° with respect to the optical axis of the incident and outgoing optical axis (at an angle of 30° with respect to the manuscript 30.) The light source 14 and the position detecting roller 24 are arranged in a space formed between the bottom of the prism block 16 and the bottom of the casing 12.

According to the above-described construction, the scanner can be compact because the light source 14 is close to the roller 24.

A detailed description will hereunder be given of the third embodiment for the present invention.

Figure 12:
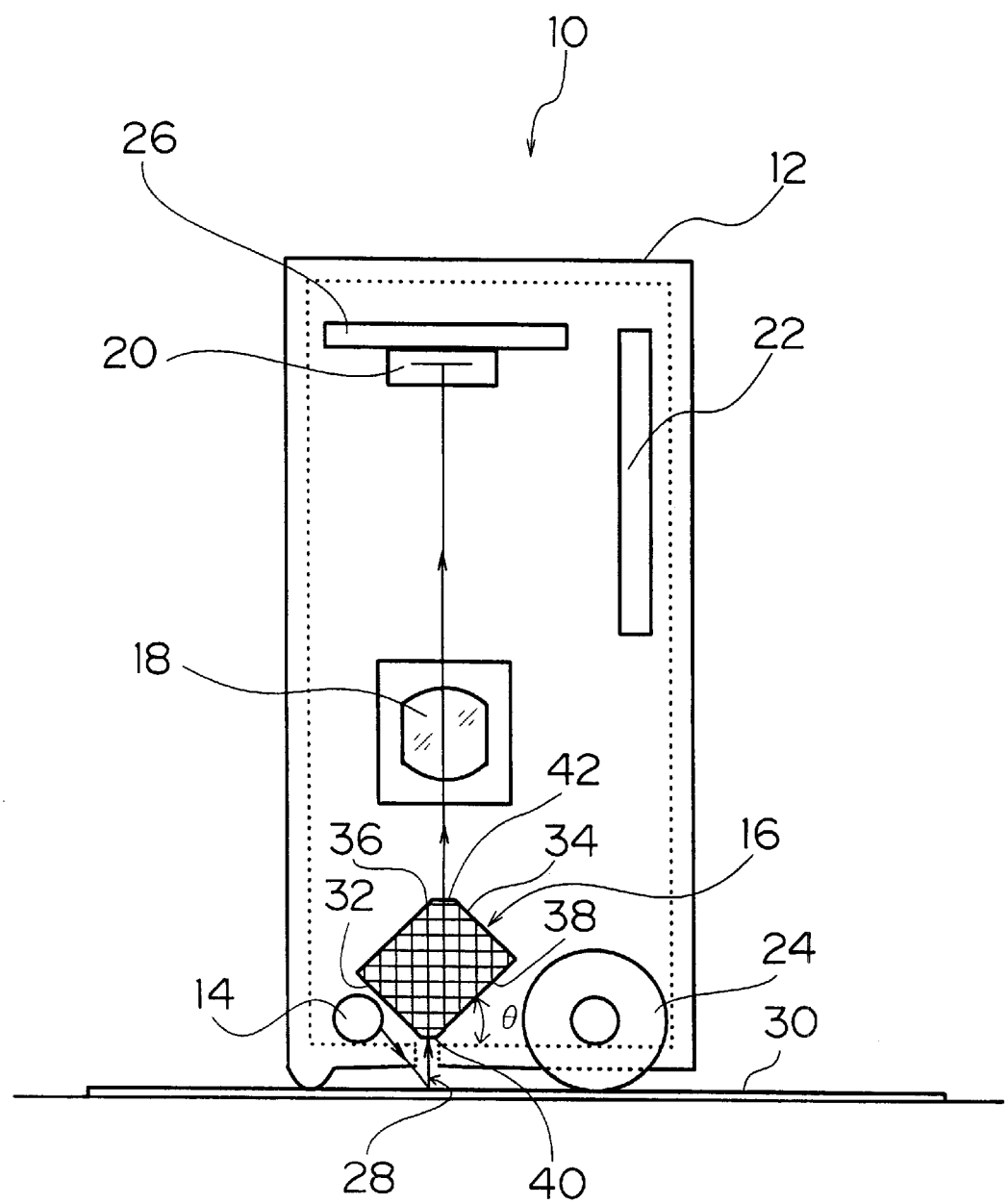
FIG. 12 is a side perspective diagram of the handy scanner according to the third embodiment of the present invention.

FIG. 12 is a perspective side view of a handy scanner according to the present invention. Parts similar to those described with reference to FIG. 1 are denoted by the same reference numerals, and an explanation of them will be omitted.

A plane (an incident plane) 40, which is substantially parallel to the manuscript 30, is formed in proximity to an edge where lower reflective planes 32, 38 intersect. Likewise, a plane (an outgoing plane) 42, which is parallel to the manuscript 30, is formed in proximity to an edge where upper reflective planes 34, 36 intersect. The incident plane 40 and the outgoing plane 42 are formed so as not to obstruct the reflection on the reflective planes 32, 38, 34, 36.

The width (W1) of the incident plane 40 is narrower than the width (W2) of the outgoing plane 42 (see FIG. 13), thereby preventing the light from diagonally entering the incident plane 40. If the incident plane 40 is extremely narrow, the incidence of the required quantity of light is obstructed due to the reflection and diffusion of the light at the edge. For this reason, the incident plane 40 is formed to be the same size as a pixel of the CCD for example. Thereby, the required quantity of incident light can be secured, and it is possible to prevent the undesired light from entering the incident plane 40.

On the other hand, the width (W2) of the outgoing plane 42 is broader than the width (W1) of the incident plane 40. If the outgoing plane 42 is narrow, the quantity of light toward the sagittal plane (in the horizontal direction in the drawing) is reduced to lower the resolution. For this reason, the width of the outgoing plane 42 must be determined to obtain the sufficient quantity of light on the sagittal plane.

FIGS. 3–6 describe the operation of the four-plane reflective prism block 16. The reflection route and the number of reflections are changed by varying the ratio in length of two pairs of parallel planes. The outgoing direction can also be changed horizontally and vertically, and the optical path length can be appropriately changed.

Figure 13A:
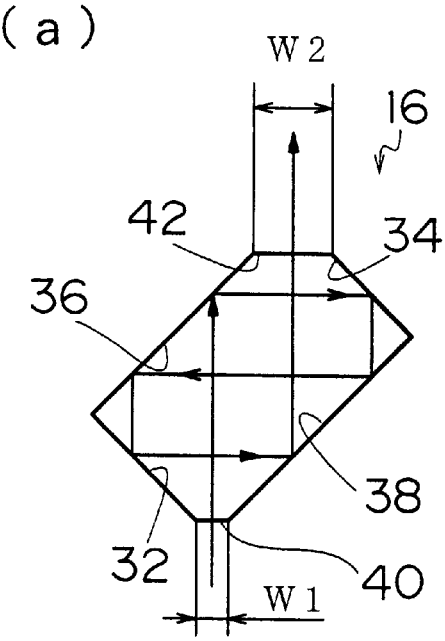
FIGS. 13(a) and 13(b) are views showing an example of a route of reflection in a four-plane reflection optical system in which an incident light from below exits upward.
Figure 13B:
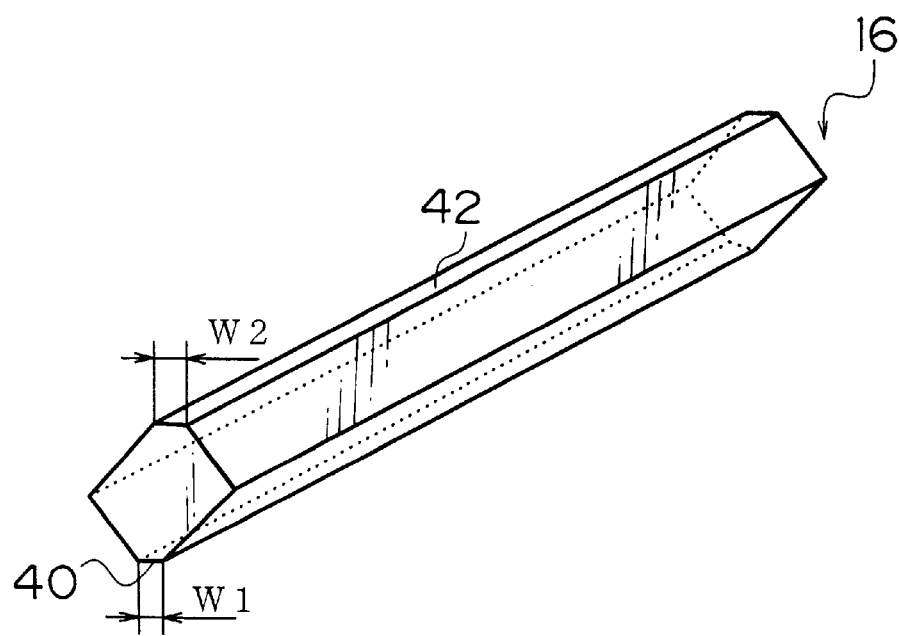

In the vertical scanner in FIG. 12, in which the slit 28, the lens 18 and the CCD 20 are vertically arranged in substantially a straight line, the incident ray is parallel to the outgoing ray as shown in FIGS. 13(a) and 13(b). The scanner 10 of FIG. 12 uses the prism block 16 of A:B=9:11 (the total number of reflections is eighteen and the optical path length is $11 \times 2^{1/2} \times A$.)

As stated above, the width (W1) of the incident plane 40 of the prism block 16 is smaller than the width (W2) of the outgoing plane 42 (W1<W2.) Thus, the incidence of the required light can be secured, and the entry of the undesired light can be prevented. Moreover, the sufficient quantity of the outgoing light is secured. Thereby, the resolution can be improved.

FIG. 14 illustrates the fourth embodiment of the present invention. Parts similar to those described with those described with reference to FIG. 1 are denoted by the same reference numerals, and a description will be omitted. The scanner 10 in FIG. 14 is constructed in such a way that the optical axis between the lens 18 and the CCD 20 is substantially parallel to the manuscript 30. The prism block 16 reflects the light from the slit 28, and the light is reflected at a right angle in the drawing. The horizontal scanner 10 has the prism block 16 in which the outgoing ray is directed in a direction perpendicular to the incident ray as shown in FIGS. 15(a) and 15(b).

The width (W1) of the incident plane 40 of the prism block 16 is smaller than the width (W2) of the outgoing plane 42 (W1<W2.) Thus, it is possible to secure the incidence of the required light and prevent the entry of undesired light. Moreover, the sufficient quantity of the outgoing light on the sagittal plane can be secured. Moreover, the resolution can be improved.

A reflective optical unit, which is equivalent to the prism block 16, is constructed by combing four plate-like mirrors 52, 53, 56, 58 as shown in FIG. 16. In this case, a gap (an opening) 60 is provided on a line where the mirror 52 (equivalent to the fourth reflective plane 32 in FIG. 15) intersects the mirror 58 (equivalent to the third reflective plane 38 in FIG. 15), thereby forming an incident opening equivalent to the above-mentioned incident plane 40. A gap (an opening) 62 is provided on a line where the mirror 54 (equivalent to the second reflective plane 34 in FIG. 15) intersects the mirror 58, thereby forming an outgoing opening which is equivalent to the above-mentioned outgoing plane 42.

The width (W1) of the opening 60 which is the incident opening is smaller than the width (W2) of the opening 62 which is the outgoing opening. Thereby, as is the case with the prism block 16, it is possible to prevent the light from diagonally entering the incident opening and secure the sufficient quantity of the outgoing light on the sagittal plane.

Figure 17:
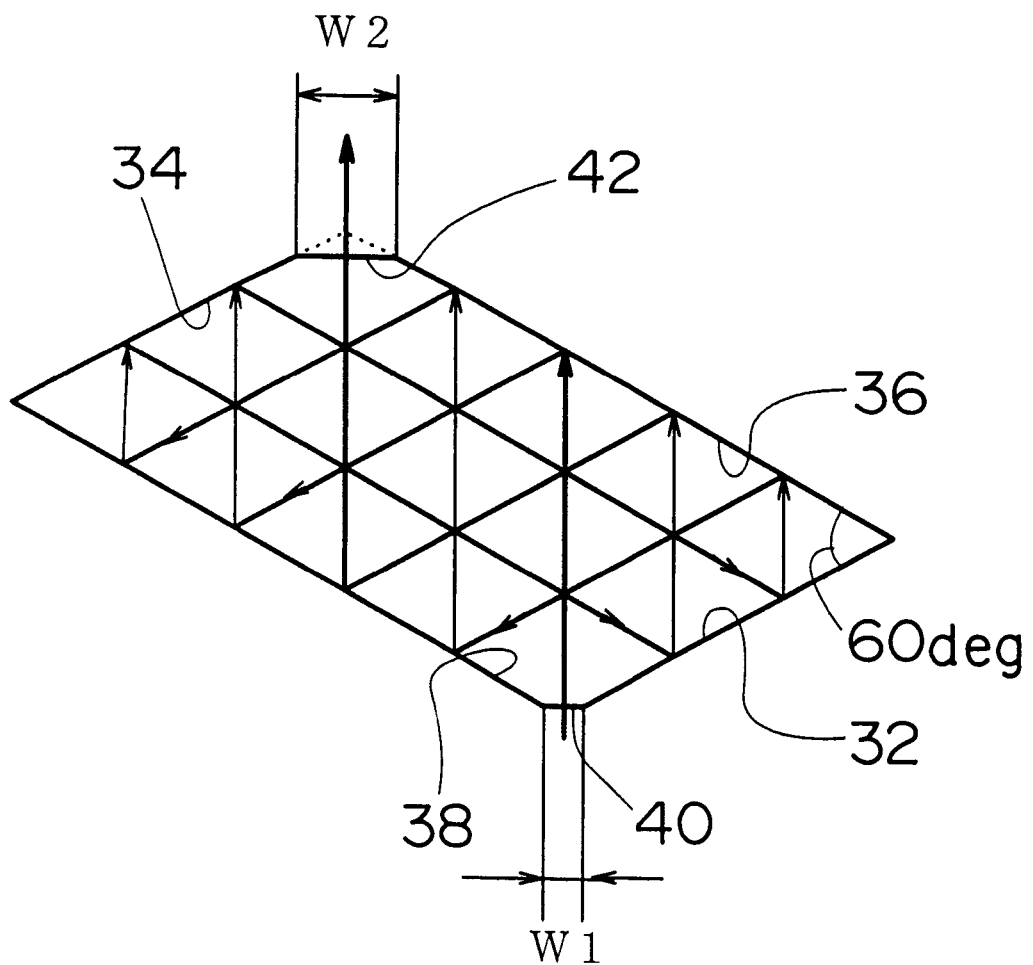
FIG. 17 is a schematic view illustrating a route of reflection in a four-plane reflective optical system which is constructed in such a way that two pairs of parallel reflective planes intersect at an angle of 60° or 120°.

In the fourth embodiment, two pairs of parallel reflective planes intersect at a right angle, but the present invention should not to restricted to this. As shown in FIG. 17, two pairs of parallel reflective planes intersect at an angle of 60° or 120°.

In this case, the incident plane 40 is formed at one edge where the two pairs of parallel reflective planes intersect at an angle of 120°, and the incident plane 40 is substantially vertical to the incident ray. The outgoing plane 42 is formed at the other edge where the two pairs of parallel reflective planes intersect at an angle of 120°, and the outgoing plane 42 is substantially vertical to the outgoing ray. In this case, the width (W1) of the incident plane 40 is narrower than the width (W2) of the outgoing plane 42.

Moreover, in the fourth embodiment, the incident opening and the outgoing opening are specified by the incident plane 40 and the outgoing plane 42 of the prism block and the openings 60, 62 of the combined mirrors, but the present invention should not be restricted to this. An aperture member may specify the incident part and the outgoing part.

For example, an aperture member with a slit which specifies the incident part is disposed in front of the incident plane 40 of the prism block 16, and an aperture member with a slit which specifies the outgoing part may be disposed behind the outgoing plane 42 of the prism block 16. In this case, the width of the incident plane 40 and the outgoing plane 42 of the prism block 16 can be equal. The aperture member may specify the incident part or the outgoing part.

A detailed description will hereunder be given of the fifth embodiment of the present invention.

Figure 18:
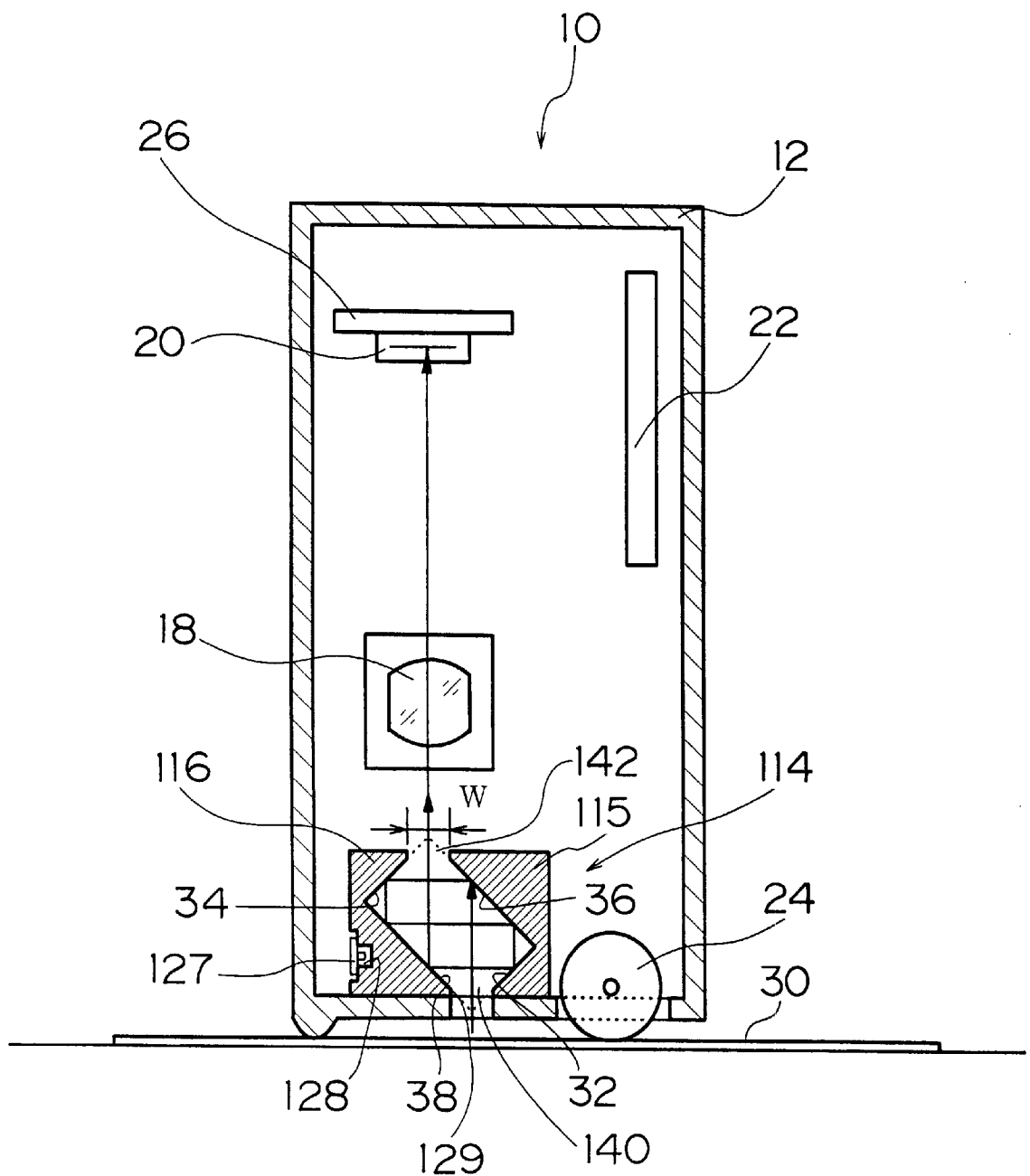
FIG. 18 is a side sectional view of the handy scanner according to the fifth embodiment of the present invention.
Figure 20:
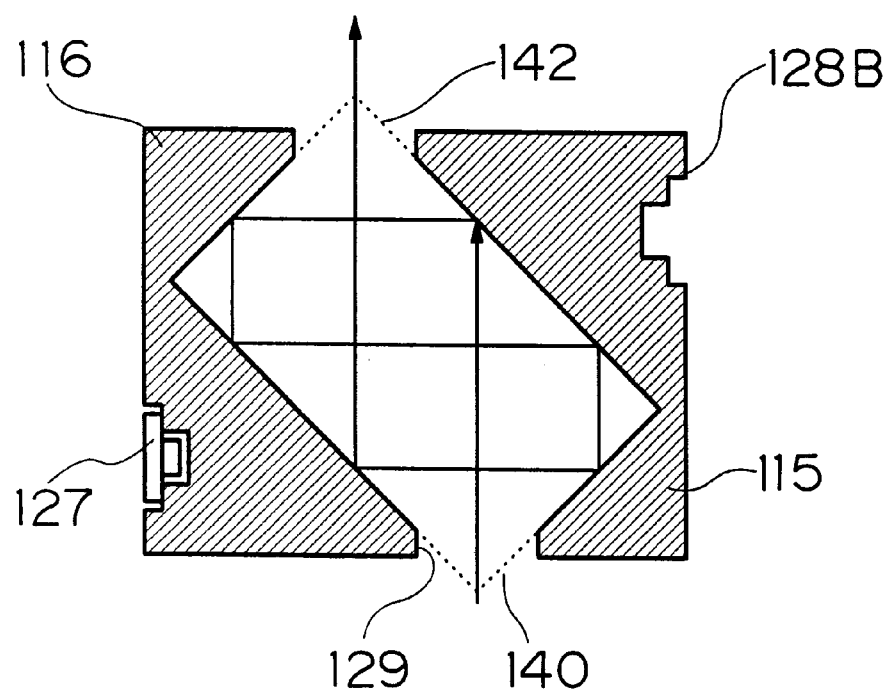
FIG. 20 is a sectional view illustrating an example in which two optical blocks have the same shape.

FIG. 18 is a side sectional view of the handy scanner according to the present invention. Parts similar to those described with reference to FIG. 1 will be denoted by the same reference numerals, and a description of them will be omitted.

The scanner 10 in FIG. 18 has a reflective optical unit 114 in the casing 12. The reflective optical unit 114 is composed of optical blocks 115, 116. The optical blocks 115, 116 are made of transparent optical plastic. The reflective planes 32, 34 of the length A and the reflective planes 36, 38 of the length B (>A) which are perpendicular to the reflective planes 36, 38 are formed in the optical blocks 115, 116. The two blocks are arranged so that the reflective planes of the same length face one another. A fixing member (not shown) fixes the casing 12. The optical plastic is used because it is light weight and easy to mold compared to glass.

According to the above-mentioned arrangement, the reflective optical system is formed which has a pair of parallel reflective planes 32, 34 of the length A and a pair of parallel reflective planes 36, 38 of the length B (>A). The lower reflective planes 32, 38 are inclined at an angle of θ=45° with respect to the manuscript 30. A reflective coating may be coated on the reflective planes 32–38 in order to improve the reflection sufficiency.

The two blocks 115, 116 are arranged at a predetermined interval (W). That is, an opening equivalent to an incident opening 140 is formed on the line where the reflective plane 32 intersects the reflective plane 38. An opening equivalent to an outgoing opening 142 is formed on the line where the reflective plane 34 intersects the reflective plane 38. Thus, by restricting the width of the incident opening 140, it is possible to secure the incidence of the required light and prevent the entry of undesired light. Moreover, the proper quantity of light can be obtained in accordance with the width of the outgoing opening 142.

If the outgoing opening 142 is narrow, the quantity of light on the sagittal plane is reduced to thereby lower the resolution. For this reason, the width of the outgoing opening must be determined in a manner to obtain the sufficient quantity of light on the sagittal plane.

A concave (light source arranging part) 128 is formed at the side of the left optical block 116, and a light source 127, which illuminates the manuscript, is attached to the light source arranging part 128 (see FIG. 19). The light source 127 such as a light emitting diode (LED) is arranged at the concave 128. The light from the light source 127 enters the optical block 116, and the light passes the block to be irradiated from an illumination light outgoing plane 129 the toward the manuscript 30. The light source 127 is not restricted to the LED array, but it may be a linear fluorescent light.

A slit is formed at the bottom of the casing 12, and the slit is located just below the incident opening 140 of the reflective optical unit. The light, which exits the illumination light outgoing plane 129 is irradiated toward the manuscript 30 through the slit. The light is conducted from the manuscript 30 into the casing 12 through the slit, and the light enters the optical unit 114 via the incident plane 140.

The light which enters the reflective optical unit 114 is reflected on the reflective plane 36 to the left at a right angle, and the light is sequentially reflected on the reflective planes 34, 38, 36, 32, 38. The light exits the reflective optical unit 114 through the outgoing opening 142.

The lens 18 and the CCD 20 are arranged above the outgoing plane 142 of the reflective optical unit 114. The light which exits the reflective optical unit 114 is conducted to the CCD 20 through the lens 18. The light which enters the light accepting plane of the CCD 20 is transformed into an electric signal in accordance with the intensity of light. The electric signal is conducted to the scanner circuit 22. Then, an image signal processing means of the scanner circuit 22 obtains the information about the image on the manuscript 30.

The position detecting roller 24, which is provided at the lower part of the casing 12, is provided with a means (not shown) such as an encoder for detecting the number of revolutions in order to detect a position to which the scanner 10 moves and the moving amount of the scanner 10.

A description will be given of the operation of the handy scanner which is constructed in the above-mentioned manner.

FIGS. 18–25 describe the reflective operation of the four-plane reflective optical system composed of two pairs of parallel planes. According to the construction, the number of reflections can be increased and decreased in accordance with the ratio (A:B) of the length of two pairs of the parallel reflective planes. A relatively long optical path can be formed without increasing and decreasing a conventional turning mirror. Thereby, there is no necessity to finely adjust the angle of the mirror, and the handy scanner can be more compact.

An optical system, which is composed of two pairs of parallel planes, consists of two optical blocks 115, 116, and the illumination light source 127 is attached to the other optical block 116. The light source 127 can be integrated with the optical block 116, and thus the handy scanner can be more compact.

The light from the light source 127, which is attached to the optical block 116, is conducted to the manuscript 30 while reflecting at the inside of the optical block 116. The light is efficiently irradiated toward the manuscript 30 from the illumination light outgoing plane 129. That is, the optical block 116 serves as a reflective member, which conducts the light from the manuscript 30 to the lens 18, and as a light guide member, which conducts the light from the light source 127 to the manuscript 30. Thereby, the manuscript 30 can be efficiently illuminated.

The handy scanner is basically constructed in the above-mentioned manner, but it may be modified and improved in a variety of ways as described below.

First, the two optical blocks 115, 116 may have the same shape (they are symmetric if turned.) When each optical block is mounted, it is rotated to thereby compose the reflective optical unit 114. In this case, if the concave 128B remains unused, there is no problem in the reflective optical system which conducts the light from the manuscript 30 to the lens 18. Thus, two optical blocks 115, 116 have completely the same shape, and the optical blocks can be molded from one model, so that the cost can be greatly reduced.

Figure 21:
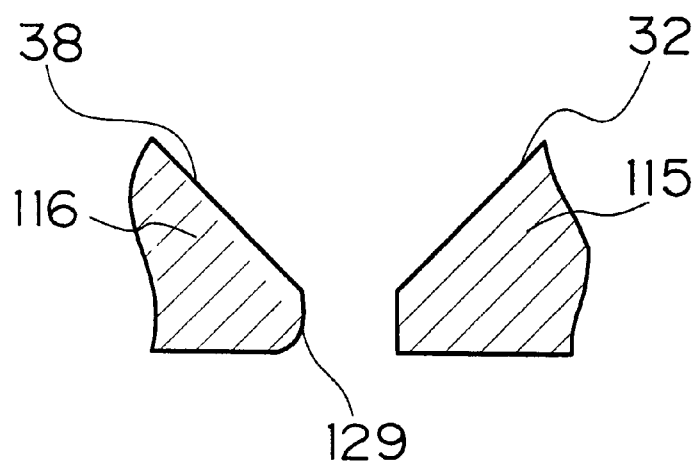
FIG. 21 is a partially-enlarged view illustrating the shape of an illumination light outgoing plane of the optical block.

Second, as shown in FIG. 21, a part of the optical block 116, which faces the manuscript 30, that is, the illumination light outgoing plane 129, through which the illumination light exits from the light source 127, may be a cylindrical convex lens. The light is conducted from the light source 127 to the illumination light outgoing plane 129 facing the manuscript 30 by the inner reflection in the optical block 116. If the illumination light outgoing plane 129 is a cylindrical convex lens, the illumination light is condensed by the convex lens to be efficiently irradiated to the manuscript 30.

Figure 22:
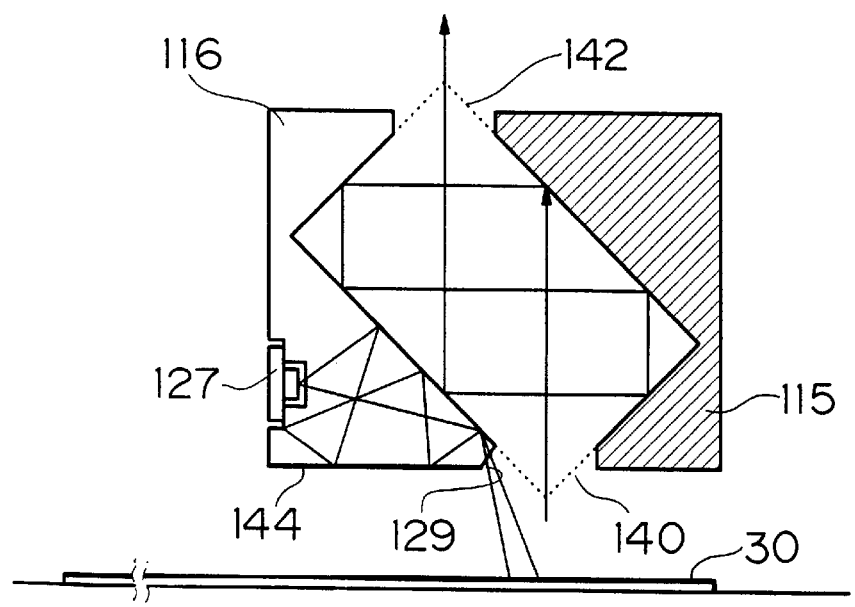
FIG. 22 is a sectional view illustrating another example of the reflective optical unit.

Third, as shown in FIG. 22, a coating is coated on a bottom face 144 of the optical block 116 in order to improve the reflection efficiency of the interior. The illumination light outgoing plane 129 is inclined at a predetermined angle with respect to the manuscript 30. According to this construction, the light is efficiently conducted from a light emitting part of the light source 127 to the illumination light outgoing plane 129. The quantity of light irradiated to the manuscript 30 can be increased compared with the case when the illumination light outgoing plane 129 is vertical to the manuscript 30.

Figure 23:
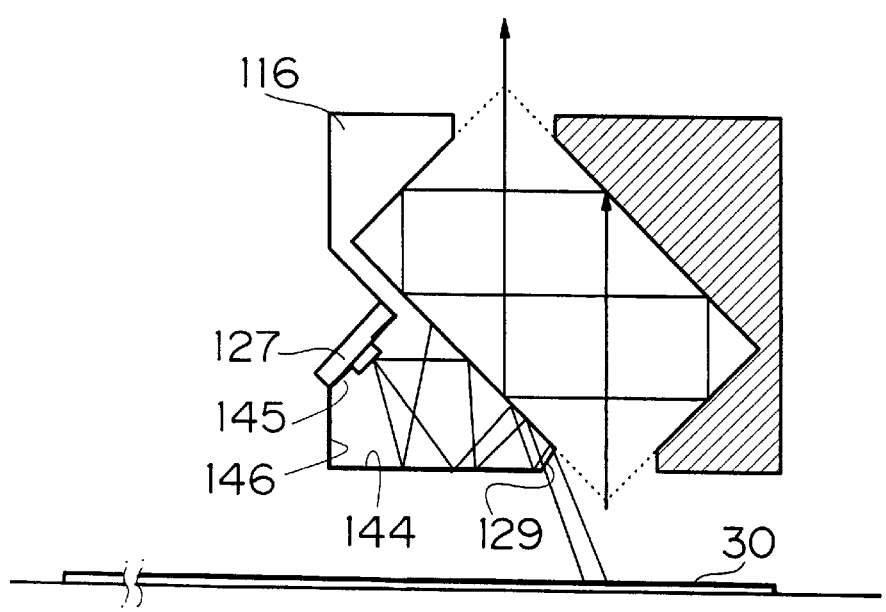
FIG. 23 is a sectional view illustrating another example of the reflective optical unit.

Fourth, as shown in FIG. 23, the light emitting part of the light source 127 is inclined to the manuscript 30, and a circumference 145 of the light source emitting part, and a side 146 of the optical block 116 and a bottom 144 are coated to improve the reflection efficiency of the interior. Thus, the light is efficiently conducted to the illumination light outgoing plane 129 facing the manuscript 30 by the inner reflection in the optical block 116, and the light can be efficiently illuminated.

Figure 24:
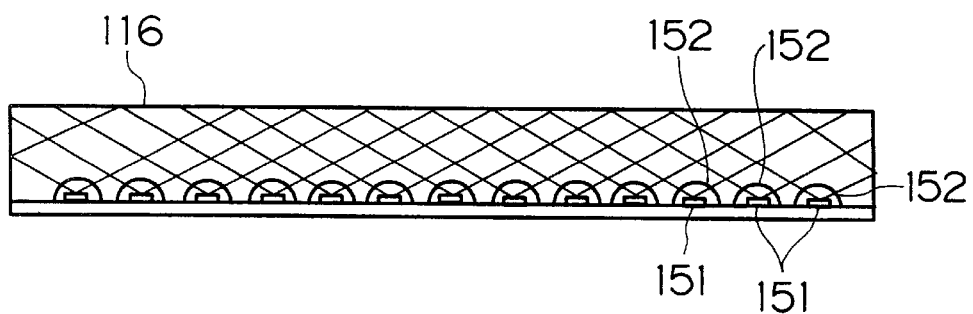
FIG. 24 is an example of a mode of a light source mounting part constructed by one or more optical blocks.

Fifth, as shown in FIG. 24, concave lenses 152 may be formed on a surface facing light emitting diodes (LED) 151 of a light emitting diode array which is equivalent to the light source 127. Thereby, the light from the LEDs 151 is diffused by the operation of the concave lens 152 and enters the optical block 116. Thus, the luminance of the LEDs can be equalized, and the manuscript 30 can be uniformly illuminated.

Figure 25:
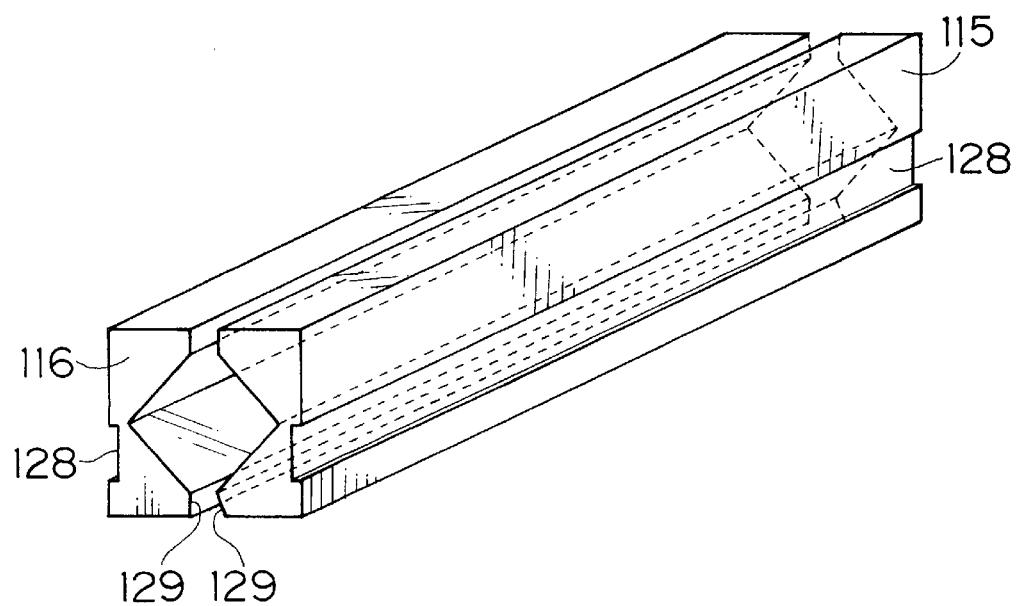
FIG. 25 is a perspective view illustrating an example in which a light source mounting part is formed at two optical blocks.

Sixth, as shown in FIG. 25, concave parts 128 for mounting the light source are formed in the right and left optical blocks 115, 116, and the illumination light sources 127 may be arranged in the optical blocks 115, 116. In this case, the illumination light outgoing planes 129 of the optical blocks 115, 116 are preferably cylindrical concave lenses, or the illumination light outgoing planes 129 are preferably inclined at a predetermined angle with respect to the manuscript 30. The uneven and overlapping parts of the manuscript 30 are not shaded or captured as images.

The above-mentioned first to sixth means may be arbitrarily combined.

In this embodiment, two pairs of parallel reflective planes intersect at a right angle. As described with reference to FIG. 11, two pairs of parallel reflective planes intersect at an angle of 60° or 120°.

FIG. 18 shows the vertical scanner, but the present invention may also be applied to a horizontal scanner which uses a reflective optical unit which an incident light from below light exits in a horizontal direction.

A description will hereunder be given of the sixth embodiment for the present invention.

Figure 26:
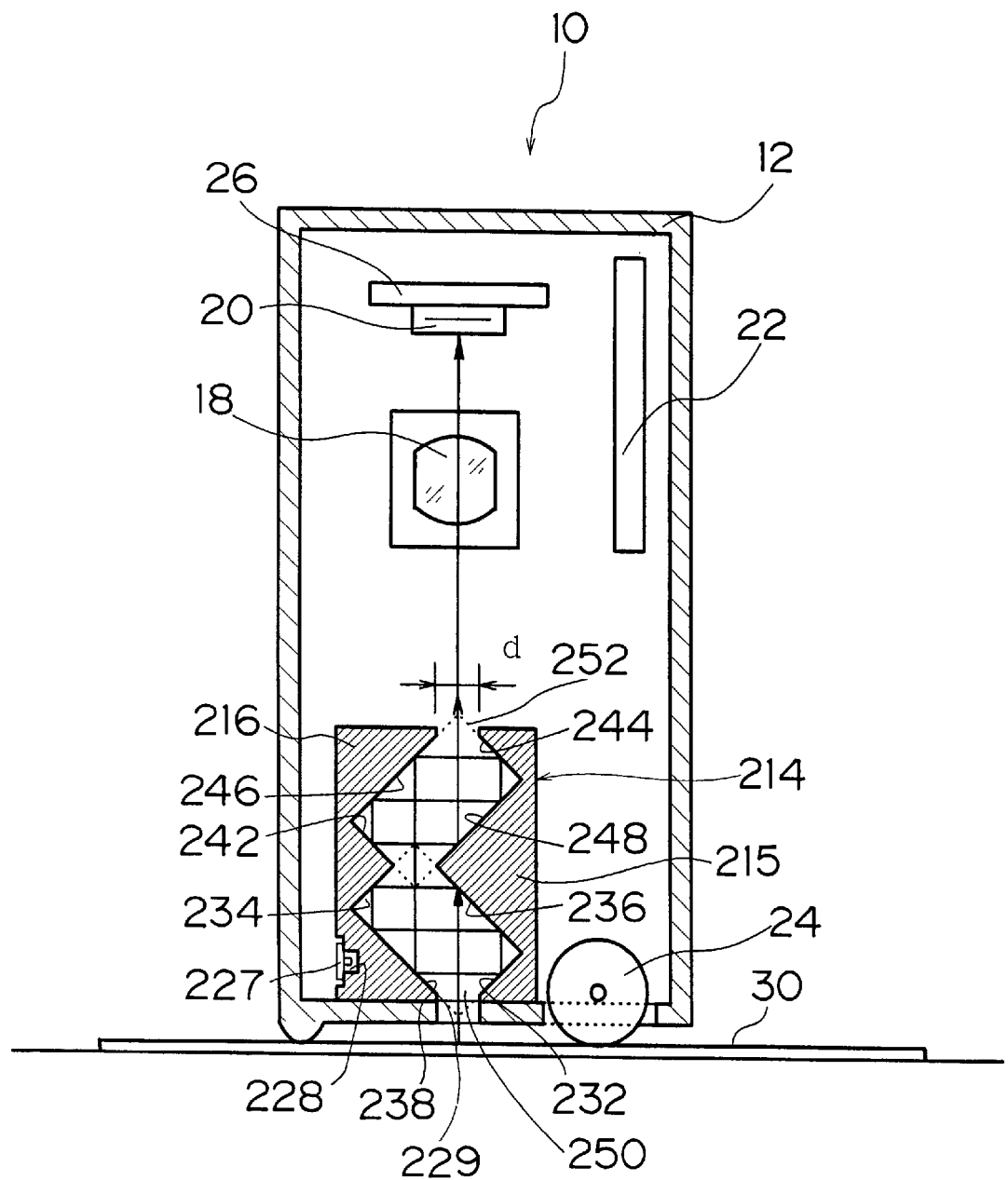
FIG. 26 is a side sectional view of the handy scanner according to the sixth embodiment of the present invention.

FIG. 26 is a sectional view of the handy scanner according to the present invention. Parts similar to those described with reference to FIG. 1 are denoted by the same reference numerals, and an explanation of them will be omitted. The scanner 10 in FIG. 26 has a reflective optical unit 214 in the casing 12. The reflective optical unit 214 consists of two optical blocks 215, 216 which are formed of transparent optical plastic.

Four reflective planes are formed at the left side of the optical block 215 in the form of W. That is, a reflective plane 232 of the length A, a reflective plane 236 of the length B (>A) perpendicular to the reflective plane 232, a reflective plane 248 of the length B perpendicular to the reflective plane 236, and a reflective plane 244 of the length A perpendicular to the reflective plane 248 are formed from the bottom.

On the other hand, four reflective planes are formed at the right side of the optical block 216 in the form of W. A reflective plane 238 of the length B, a reflective plane 234 of the length A perpendicular to the reflective plane 238, a reflective plane 242 of the length A perpendicular to the reflective plane 234, and a reflective plane 246 of the length B perpendicular to the reflective plane 242 are formed from the bottom. The reflective planes 232, 234, 236, 238, 242, 244, 246, 248 are coated with silver evaporation coating.

The optical blocks 215, 216 are arranged at a predetermined interval d, and the reflective plane 232 are parallel to the reflective plane 234 to form a pair of parallel reflective planes. Likewise, the reflective planes 236 and the reflective plane 238 are parallel to one another, the reflective plane 242 and the reflective plane 244 are parallel to one another, and the reflective plane 246 and the reflective plane 248 are parallel to one another.

Thus, the four-plane reflective optical system, which is composed of the reflective planes 232, 234, 236, 238, and the four-plane reflective system, which is composed of the reflective planes 242, 244, 246, 248, are formed in such a way as to be vertically adjacent to one another.

Since the two optical blocks 215, 216 are arranged at an interval d, an incident opening 250 is formed on a line where the reflective plane 232 intersects the reflective plane 238, and an outgoing opening 252 is formed on a line where the reflective plane 244 and the reflective plane 246. The incident opening and the outgoing opening 252 are formed so as not to obstruct the reflection on the reflective planes 232, 238, 244, 246.

By restricting the width of the incident opening 250, it is possible to secure the incidence of the required light and prevent the entry of unnecessary light. Moreover, it is possible to obtain the proper quantity of outgoing light in accordance with the width of the outgoing opening 252.

If the outgoing opening 252 is narrow, the quantity of light on the sagittal plane is decreased to thereby lower the resolution. For this reason, the width of the outgoing opening 252 must be determined so as to obtain the sufficient quantity of light on the sagittal plane.

A concave (light source mounting part) 228 is formed at the left side of the optical block 216, and a light source 227 such as a light emitting diode (LED) array for illuminating the manuscript is mounted in the concave 228. The light from the light source 227 enters the optical block 218, and passes the block 216 to be irradiated toward the manuscript 30 from an illumination light outgoing plane 229. The light source 227 is not restricted to the LED array, but it may be a linear fluorescent lamp.

A slit is formed at the bottom of the casing 12 and just below the incident opening 250 of the reflective optical unit 214. The light which exits the illumination light outgoing plane 229 is irradiated to the manuscript 30 through the slit. The light is conducted from the manuscript 30 into the casing 12 through the slit, and the light enters the reflective optical unit through the incident opening 250.

The light, which enters the reflective optical unit 214, is reflected on the reflective plane 236 to the left at a right angle. Thereafter, the light is sequentially reflected on the reflective planes 234, 238, 236, 232 and 238. The light exits the lower four-plane reflective optical system toward the upper four-plane reflective optical system. The light, which enters the upper four-plane reflective optical system, is reflected on the reflective plane 246 to the right at a right angle. Thereafter, the light is reflected on the reflective planes 244, 248, 246, 242, and 248. The light finally exits the reflective optical unit 214 through the outgoing opening 252.

The lens 18 and the CCD 20 are arranged above the outgoing opening 252 of the reflective optical unit 214, and the light is conducted from the reflective optical unit 214 to the CCD 20 through the lens 18. The light, which enters the light accepting plane 20, is transformed into an electric signal in accordance with the intensity of the light. Then, the electric signal is conducted to the scanner circuit 22. The image signal processing means of the scanner circuit 22 obtains the information about the image on the manuscript. The position detecting roller 24 is disposed at the lower part of the casing 12, and the roller 24 is provided with a means such as an encoder (not shown) which detects the number of revolutions, thereby detecting a position to which the scanner 10 moves and the moving amount of the scanner 10.

A description will be given of the operation of the handy scanner which is constructed in the above-mentioned manner.

Figure 27:
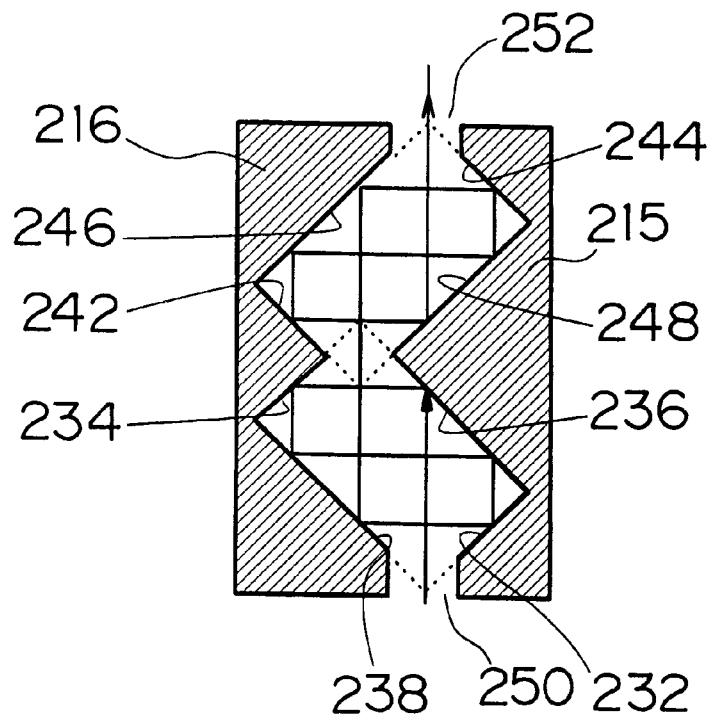
FIG. 27 is an enlarged sectional view of the reflective optical unit in FIG. 26.

The reflective operation of the four-plane reflective optical system, which is composed of two pairs of parallel planes, was previously described. In the embodiment described with reference to FIG. 26, two four-plane reflective optical systems are vertically combined (see FIG. 27). Thus, the scanner 10 can be slimmer compared with the case when one four-plane reflective optical system forms the optical paths of equal length in particular, if the two four-plane reflective optical systems are connected to one another as shown in FIG. 27, it is easier to adjust the optical axis.

If the scanner 10 provided with the reflective optical unit 214 is moved along the manuscript 30 in one direction (to the right or left in FIG. 26), the roller 24 rotates in contact with the manuscript 30. The scanner can smoothly move with a distance between the scanner 10 and the manuscript 30 being fixed. The position of the scanner is detected based on the rotation of the roller 24, while the light is conducted from the manuscript 30 to the CCD 20 via the reflective optical unit 214 and the lens 20. Thereby, the information about the image on the manuscript 30 can be obtained.

Figure 28:
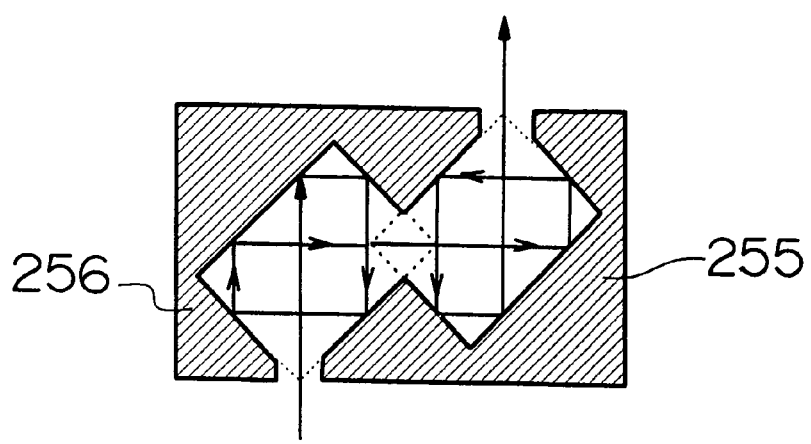
FIG. 28 is a sectional view illustrating another mode of the reflective optical unit.

FIG. 26 describes an example in which the two four-plane reflective optical systems are vertically combined, but two four-plane reflective optical systems may be horizontally combined as shown in FIG. 28.

That is, in FIG. 28, the two four-plane reflective optical systems in FIG. 3 are horizontally combined. The optical blocks 255 and 256 have the same shape. One optical block 255 is rotated to match the other optical block 256, and both blocks can be manufactured from one model.

Thus, the manufacturing cost can be significantly reduced. If the four-plane reflective optical systems are arranged right and left to be adjacent to one another, the vertical size can be smaller compared to FIG. 27.

Figure 29:
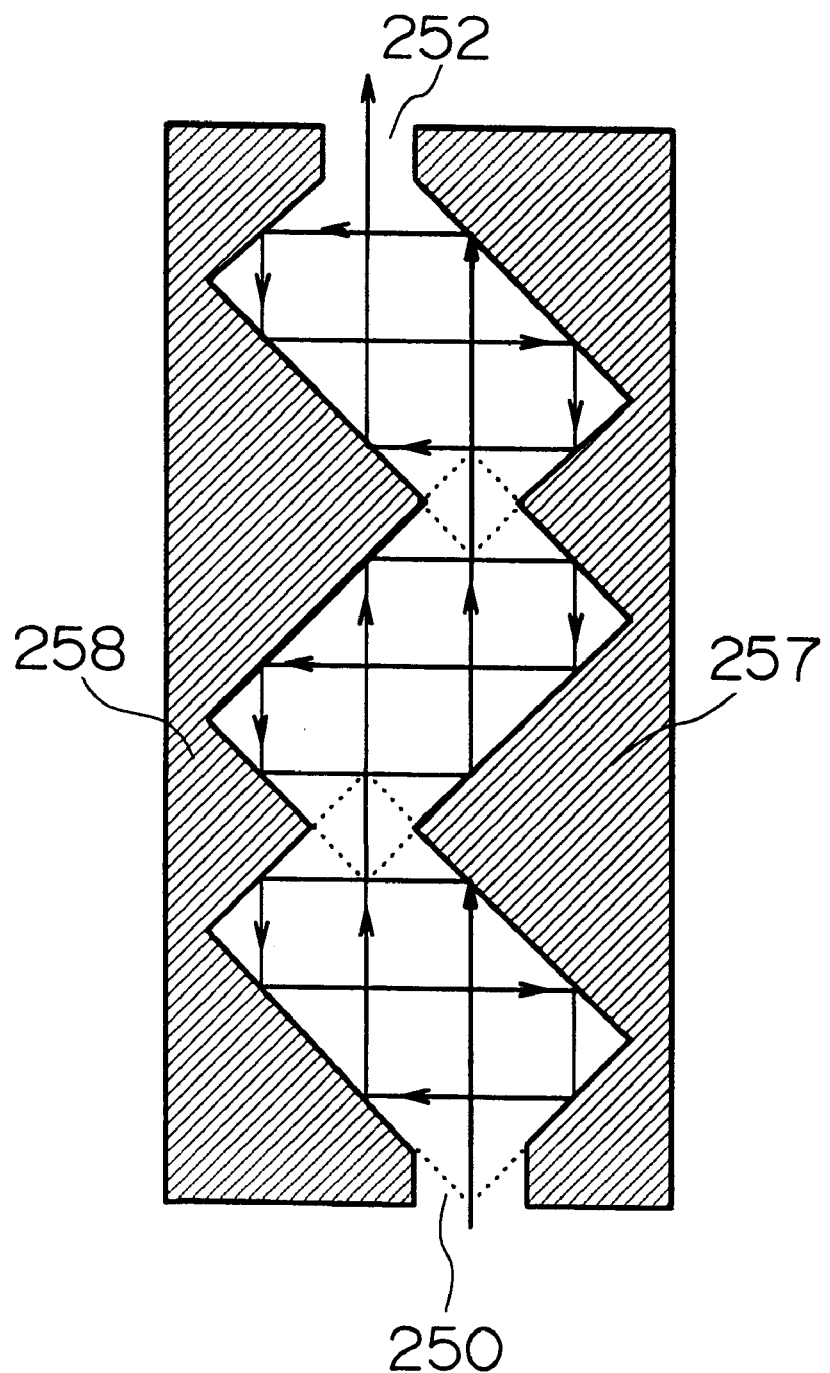
FIG. 29 is a sectional view of another mode of the reflective optical unit.

In the sixth embodiment, two four-plane reflective optical systems are formed, but three four-plane reflective optical systems may be formed by two optical blocks 257, 268 facing one another as shown in FIG. 29. The number of four-plane reflective optical systems is not restricted.

Furthermore, a variety of reflective optical paths may be formed by combining the reflective optical units shown in FIGS. 27 and 28. That is, the reflective optical units in FIGS. 27 and 28, which are basic units, are arbitrarily combined to form a variety of reflective optical units.

Similarly, if one four-plane reflective optical system or a plurality of four-plane reflective optical systems, which are basic units, are modularized, the number of parts can be reduced and a variety of light paths can be formed.

If, for example, it is difficult to form a linear optical path due to the layout including other members such as the lens 18 and the position detecting roller 24, a various kinds of optical blocks are combined to form a variety of optical paths.

In this embodiment, a pair of parallel reflective planes 232, 234 intersect a pair of parallel reflective planes 236, 238 at a right angle, but they may also intersect at an angle of 60° or 120° as shown in FIG. 11.

In this embodiment, the vertical scanner is used in which the incident opening 250, the lens 18 and the CCD 20 are arranged substantially in a straight line, but the present invention may also be applied to a horizontal scanner which uses a reflective optical unit in which the incident light from below enters in a perpendicular direction (horizontal direction).

A detailed explanation will hereunder be given of the seventh embodiment for the present invention.

Figure 30:
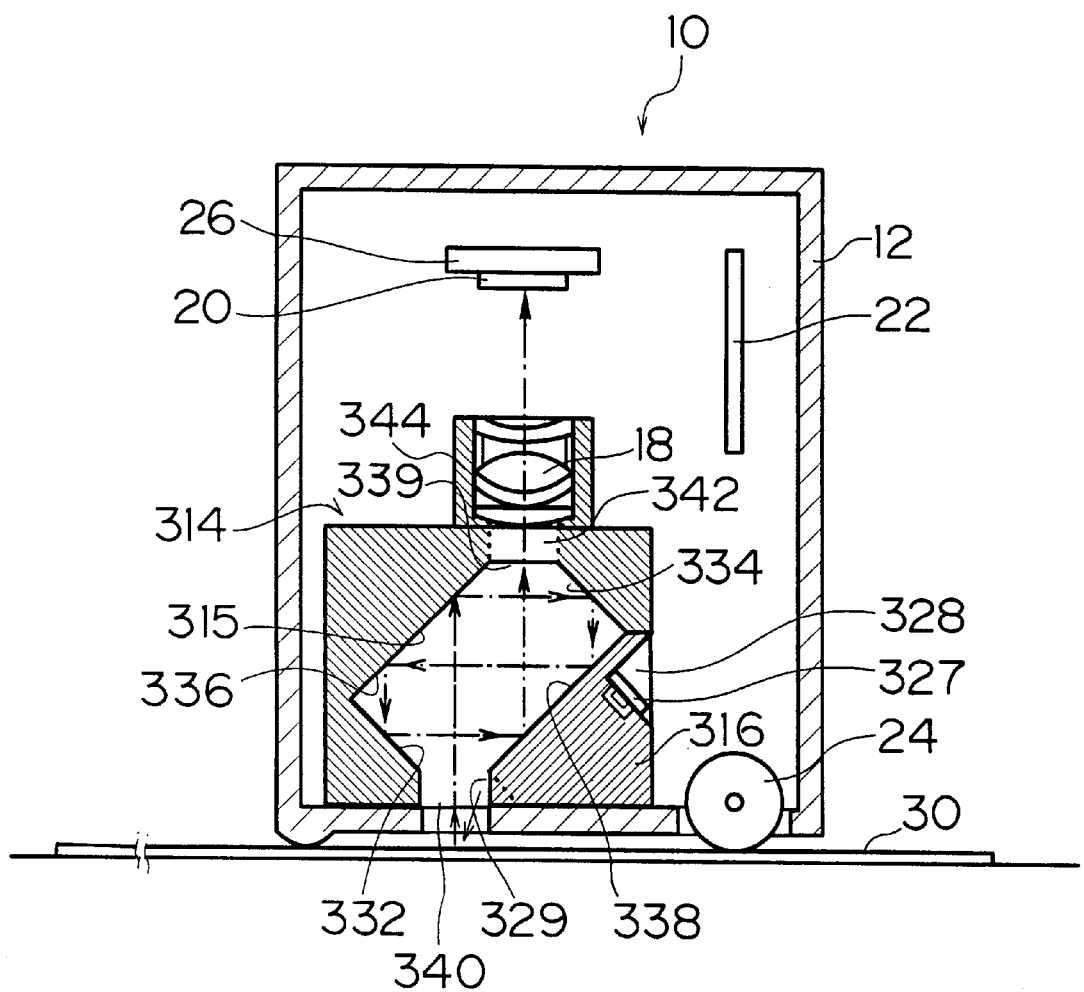
FIG. 30 is a side sectional view of the handy scanner according to the seventh embodiment of the present invention.

FIG. 30 is a sectional view illustrating the handy scanner according to the present invention. Parts similar to those described with reference to FIG. 1 are denoted by the same reference numerals, and an explanation of them will be omitted. The scanner 10 in FIG. 30 has a reflective optical unit 314 in the casing 12. The reflective optical unit 314 is composed of two optical blocks 315, 316 which are molded by transparent optical plastic.

Figure 31:
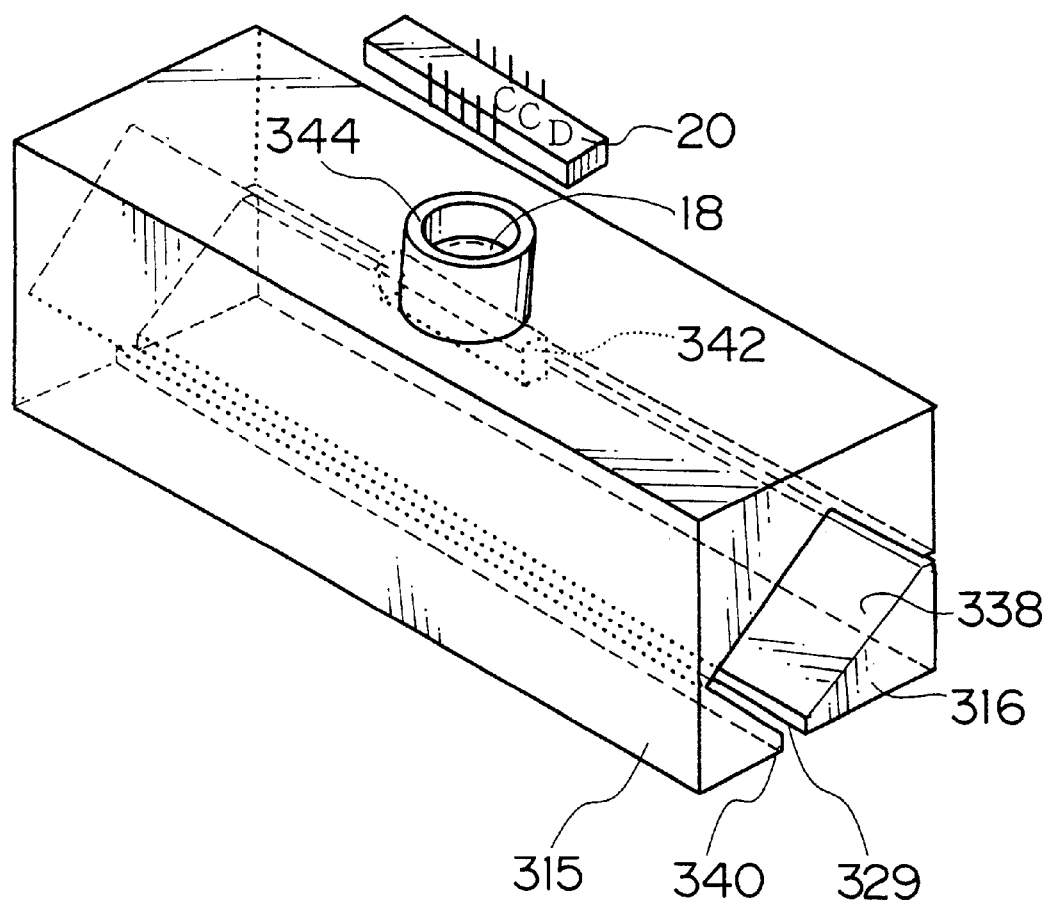
FIG. 31 is a perspective view illustrating the construction of an optical system of the scanner in FIG. 30.
Figure 33:
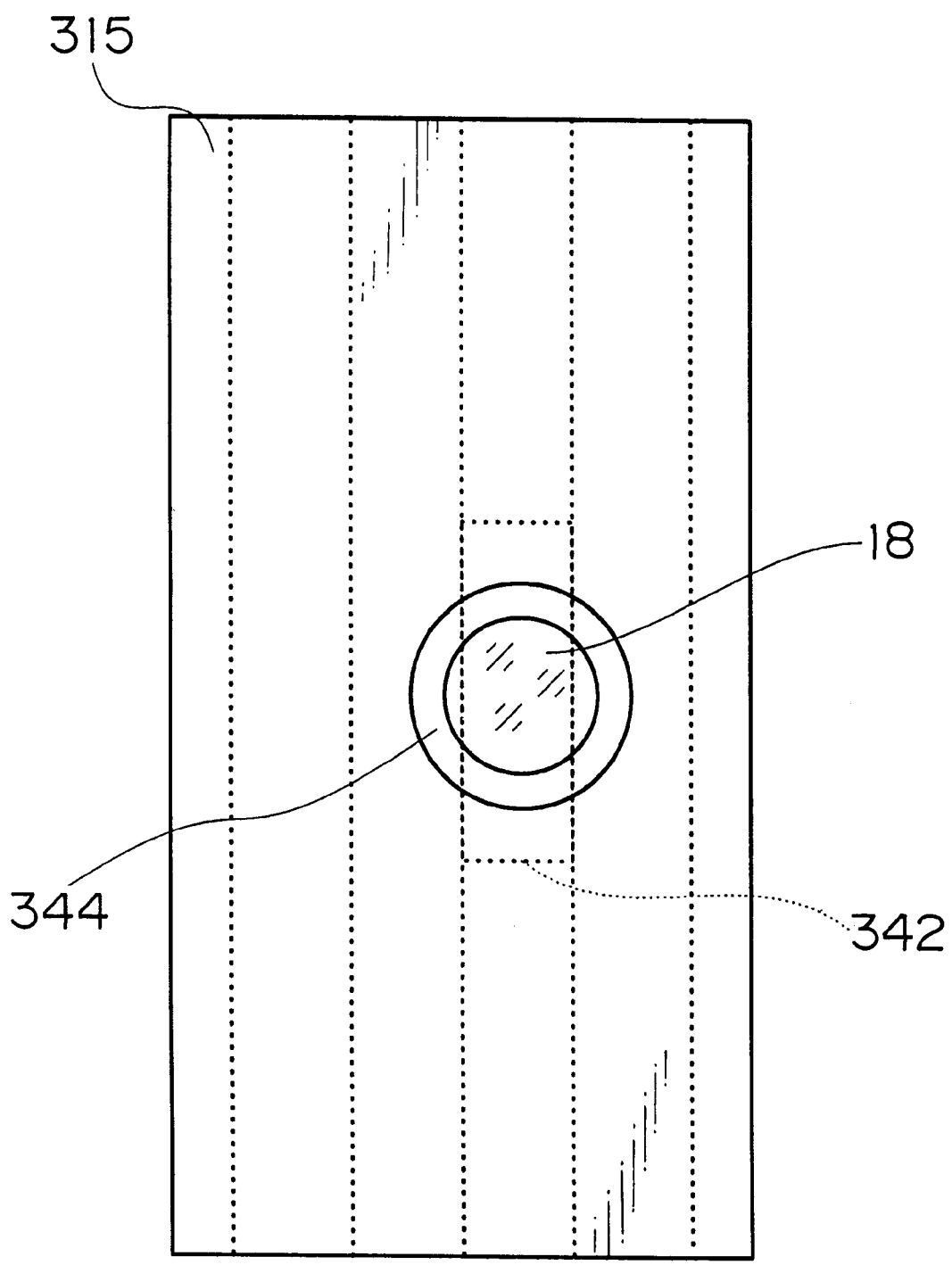
FIG. 33 is a plane view of the reflective optical unit in FIG. 30.

A reflective plane 332 of the length A, a reflective plane 336 of the length B (>A) perpendicular to the reflective plane 332, and a reflective plane 334 of the length A parallel to the reflective plane 332 are formed in the optical block 315. A flat plane 339 is formed at an edge where the reflective plane 336 intersects the reflective plane 334. A slit, which is an outgoing opening for a luminous flux, is formed on the flat plane 339 (see FIGS. 31, 32 and 33).

If the outgoing opening 342 is narrow, the quantity of light on the sagittal plane is reduced to thereby lower the resolution. The width of the outgoing opening 342 must be determined so as to obtain the sufficient quantity of light on the sagittal plane.

The optical block 315 is provided with a cylindrical lens supporting member 344 on the outgoing opening 342. That is, the lens supporting member 344 is integrated with the optical block 315, and the lens 18 is mounted in the lens supporting member 344 and adhered thereto.

On the other hand, the optical block 316 has a reflective plane 338 which is inclined at an angle of 45°. The reflective plane 338 is arranged parallel to the reflective plane 336 of the optical block 315. A concave (a light source mounting part) 328 is formed at the side of the optical block 316, and a light source 327 such as a light emitting diode (LED) array for illuminating the manuscript is mounted in the concave 328. The light source 327 is not restricted to the LED array, and it may be a linear fluorescent lamp.

Since the illumination light source 327 is integrated with the optical block 316, the light source 327 can be more compact. The light generated from the light source 327 is conducted to the manuscript 30 while reflecting within the optical block 316. The light is efficiently irradiated to the manuscript 30 from an illumination light outgoing plane 329 facing the manuscript 30.

The illumination light outgoing plane 329 is inclined at a predetermined angle with respect to the manuscript 30, or it is a cylindrical convex lens, so that the manuscript 30 can be illuminated.

The optical block 316 is supported by a supporting mechanism (not shown) in a manner to horizontally move in FIG. 30. By moving the optical block 316 horizontally, the width of the incident opening 340 can be changed, and the distance between the reflective planes 336, 338 is increased and decreased to vary the optical path length of the reflection route.

A slit is formed at the bottom of the casing 12 and just above the incident opening 340 of the reflective optical unit 314. The light which exits the illumination light outgoing plane 329 is irradiated to the manuscript 30 through the slit. The light is conducted form the manuscript 30 into the casing 12 through the slit, and the light enters the reflective optical unit through the incident opening 340.

The light which enters the reflective optical unit 314 is reflected on the reflective plane 336 to the right at a right angle. Thereafter, the light is sequentially reflected on the reflective planes 334, 338, 336, 332, and 338. The light finally exits the reflective optical unit 314 through the outgoing opening 342.

The CCD 20 is supported by a supporting mechanism (not shown) in a manner to move vertically and horizontally in FIG. 30. The reason why the CCD 20 is movably supported is that the reflective optical path length is increased and decreased and the optical axis of the outgoing light from the reflective optical unit 314 shifts horizontally when the optical block 316 is horizontally moved, and accordingly, the light path length must be adjusted and the CCD 20 must be aligned.

The light which enters the light accepting plane of the CCD 20 is transformed into an electric signal in accordance with the intensity of light, and the electric signal is conducted to the scanner circuit 22. The image signal processing means of the scanner circuit 22 obtains the information about the image on the manuscript. The position detecting roller 24, which is disposed at the lower part of the casing 12, is provided with a means such as an encoder which detects the number of revolutions, thereby detecting a position to which the scanner 10 moves and the moving amount of the scanner 10.

A description will be given of the operation of the handy scanner which is constructed in the above-mentioned manner.

FIGS. 30–33 describe the reflective operation of the reflective optical unit composed of two parallel planes.

According to the construction described, the number of reflections can be increased and decreased in accordance with the ratio (A:B) in the length between two pairs of parallel reflective planes, and a relatively long optical path can be formed without providing a conventional turning mirror. Thereby, there is no necessity to finely adjust the angle of the mirror, and the reflective optical unit can be more compact.

In particular, in this embodiment, the four-plane reflective optical system, which has two pairs of parallel planes, are composed of two optical blocks 315, 316, and the lens 18 of the contracted optical system is able to be integrated with the optical block 315. Thus, the optical axis of the lens 18 can be easily adjusted, and the reflective optical unit can be more compact.

In this embodiment, the lens 18 is integrated with the optical block 315, but the optical block 315 may be further provided with a supporting member which supports the CCD 20.

In this embodiment, one pair of parallel reflective planes 332, 334 intersect the other pair of parallel reflective planes 336, 338 intersect at a right angle, but they intersect at an angle of 60° or 120°.

In this embodiment, the present invention is applied to the vertical scanner, but the present invention may also be applied to a horizontal scanner which uses a reflective optical unit in which the incident light from below exits in a perpendicular direction (horizontal direction).

As set forth hereinabove, according to the reflective optical unit of the present invention, the light is reflected at least once on each plane of two pairs of parallel planes so that the route of the light can be turned. Thus, the number of reflections can be increased and decreased according to the length of two pairs of parallel planes, and a relatively long optical path can be formed without providing a turning mirror. Thereby, there is no necessity to finely adjust the angle of the mirror, and the reflective optical unit can be more compact.

The reflective plane which constructs two pairs of parallel planes can be composed of either prism blocks or optical mirrors.

If the reflective plane is composed of prism blocks, a substantially-vertical incident and outgoing plane, which is substantially vertical to the incident and outgoing rays, is formed at least in one of an area in proximity to the first edge which the light enters and an area in proximity to the second edge which the light exits. Thereby, it is possible to prevent the reflection and diffusion of the light at the apex of the edge.

On the other hand, if the reflective plane is composed of optical mirrors, an opening, which has no effect on the reflection on each plane, is formed in an area in proximity to the first edge which the light enters and an area in proximity to the second edge which the light exits. Thereby, the incidence of unnecessary light can be prevented, and the required ray can enter and outgo.

If the above-described reflective optical unit is applied to a scanner optical system, it is easy or unnecessary to adjust the angle of the reflective plane, and the reflective optical unit can be compact and slim.

According to the scanner of the present invention, the reflective optical member, which composes two pairs of parallel planes, is inclined with respect to the optical axis of the incident ray. In a space specified by the bottom of the reflective optical member and the surface of the manuscript, the illumination light source and the moving position detecting means are arranged on both sides of the optical axis of the incident ray. Thus, the illumination light source can be arranged relatively close to the moving position detecting means, and thereby, the scanner can be compact and slim.

Moreover, according to the reflective optical unit of the present invention, the incident part is narrower than the outgoing part. Thereby, the unnecessary light can be prevented from entering the reflective optical unit, and the proper quantity of the outgoing light can be obtained according to the width of the outgoing part.

Thus, if the reflective optical unit is applied to the scanner optical system, it becomes unnecessary to adjust the angle of the reflective plane, or even if necessary, it is easy to adjust the angle of the reflective planes. The scanner can be compact and slim, and the resolution can be improved.

At least one of the reflective planes composing the parallel planes of the four-plane reflective optical unit is made of optical blocks such as optical plastic, and a light source mounting part is formed in the optical block. For this reason, the illumination light source can be compactly integrated with the optical block, and thus, the reflective optical unit can be more compact. Further, the illumination light can be efficiently irradiated toward the manuscript by the inner reflection in the optical block.

In particular, since the concave lens is formed in a position to face the light emitting part of the light source in the light source mounting part, the light from the light source is diffused by the operation of the concave lens. Thus, it is possible to prevent the luminance from becoming uneven.

The cylindrical convex lens is formed on the outgoing plane which the light for illuminating the manuscript exits. Thus, the light from the light emitting part can efficiently illuminate the manuscript.

Moreover, since the parallel planes are composed of two optical blocks, it is unnecessary or easy to adjust the angle of the reflective planes, and it is easy to attach the optical blocks. In particular, the illumination light source is respectively provided in the optical blocks to thereby prevent the shade caused by the illumination.

Furthermore, the two optical blocks are symmetrical if rotated, so that the optical blocks can be made from one model. Thus, the manufacturing costs can be significantly reduced.

Furthermore, a plurality of the four-plane reflective optical systems may be sequentially arranged, so that the scanner can be more compact and slimmer compared with the case when the optical path is composed of one four-plane reflective optical system. In particular, one four-plane reflective optical system or a plurality of four-plane reflective optical systems are determined as being basic units, and each basic unit is modularized. Thus, a variety of modes can be realized by arbitrarily combining the basic units without separately using the reflective optical systems in accordance with a variety of modes. Thereby, the number of parts can be reduced.

Furthermore, if two optical blocks are arranged to face one another so as to form a plurality of four-plane reflective optical systems, the two optical blocks can have the same shape. In this case, the two optical blocks can be manufactured from one model, so that the cost can be reduced.

In addition, according to the scanner optical system of the present invention, at least one of reflective planes composing the parallel planes is constructed by one optical block, so that the lens of the contracted optical system can be integrated with the optical block. Thus, it is easy to adjust the optical axis of the lens, and the scanner can be compact.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A scanner optical system which is moved along a manuscript and conducts light from said manuscript to a line sensor via lens and reads information about an image on said manuscript by means of said line sensor, said scanner optical system comprising:

two pairs of parallel planes which are different in length;

wherein a light conducted from said manuscript into a medium area enclosed by said two pairs of parallel planes is reflected at least once on each of said parallel planes and the light exits said medium area and is conducted to said lens; and wherein said two pairs of parallel planes intersect at an angle of about 60° or 120°.

2. A scanner which is moved along a manuscript while illuminating said manuscript with an illumination light source, and conducts light from said manuscript to a line sensor, and reads information about an image on said manuscript, said scanner comprising:

a reflective optical member which has two pairs of parallel planes which are different in length, said reflective optical member wherein a light entering a medium area enclosed by said two pairs of parallel planes is reflected at least once on each of said parallel planes and the light exits said reflective optical member toward said lens so as to form an optical path;

moving position detecting means for detecting a relative moving amount of said scanner and said manuscript;

wherein said reflective member is inclined with respect to an optical axis of an incident light from said manuscript, and said illumination light source and said moving position detecting means are arranged across the optical axis of the incident light from said manuscript and in a space between a bottom face of said reflective optical member and said manuscript; and wherein said two pairs of parallel planes intersect at an angle of about 60° or 120°.

3. The scanner as defined in claim 2, wherein a light source for illuminating said manuscript is arranged below a reflective plane at the short side of the bottom of said reflective optical member, and said moving position detecting amount is arranged below a reflective plane at the long side.

4. A reflective optical unit arranged between an object and a lens of a contracted optical system so as to secure a conjugate length specified by said lens, said reflective optical unit wherein an optical path for conducting light from said object to said lens is formed, said reflective optical unit comprising:

two pairs of parallel planes which are different in length;

wherein light conducted into a medium area enclosed by said pairs of parallel planes is reflected at least once on each of said parallel plane, and the light exits said medium area, wherein reflective planes composing said two pairs of parallel planes are formed by one or more optical mirrors, and a light from said object enters a first edge where said two pairs of parallel planes intersect and exits said medium area in proximity to a second edge, and an opening which has no effect on reflection on each of said parallel planes is respectively formed in the area in proximity to said first edge and the area in proximity to said second edge; and wherein said two pairs of parallel planes intersect at an angle of about 60° or 120°.

5. A scanner optical system which has a reflective optical unit provided with reflective planes composing two pairs of parallel planes, which are different in length, and in which a light from a manuscript illuminated by a light source is reflected at least once on each of said parallel planes to secure a required conjugate length, and the light is conducted from said reflective optical unit to a line sensor via a lens so as to read information about an image on said manuscript, said scanner optical system wherein:

an incident part for light to enter said reflective optical unit is narrower than an outgoing part through which the light exits said reflective optical unit; and wherein said two pairs of parallel planes intersect at an angle of about 60° or 120°.

6. A scanner optical system which has two pairs of parallel planes, which are different in length, and in which a light from a manuscript illuminated by a light source is reflected at least once on each of said parallel planes so as to secure a necessary conjugate length, said scanner optical system wherein:

at least one of reflective planes composing said parallel planes is formed by an optical block composed of transparent optical material, said optical block being provided with a light source mounting part formed in an area other than said at least one reflective planes constructing said parallel planes.

7. The scanner optical system as defined in claim 6, wherein in said light source mounting part, a concave lens is formed on a plane facing a light emitting part of said light source.

8. The scanner optical system as defined in claim 6, wherein in said optical block, a cylindrical convex lens is formed on an outgoing plane through which a light for illuminating said manuscript exits.

9. The scanner optical system as defined in claim 6, comprising:

a first optical block in which there is formed a first reflective plane and a second reflective plane, which are different in length, among four reflective planes constructing said two pairs of parallel planes which are different in length;

a second optical block in which there is formed a third reflective plane and a fourth reflective plane, which are different in length, among four reflective planes constructing said two pairs of parallel planes which are different in length; and wherein said first and second optical blocks are arranged in such a way that reflective planes of the same length face one another, and a light source mounting part is formed in at least one of said first and second optical blocks.

10. The scanner optical system as defined in claim 6, comprising:

a first optical block in which there are formed a first reflective plane and a second reflective plane, which are different in length, among four reflective planes constructing said two pairs of parallel planes which are different in length;

a second optical block in which there are formed a third reflective plane and a fourth reflective plane, which are different in length, among four reflective planes constructing said two pairs of parallel planes which are different in length; and wherein said first and second optical blocks are arranged in such a way that reflective planes of the same length face one another, and said light source mounting part is respectively formed in said first and second optical blocks.

11. The scanner optical system as defined in claim 6, comprising:

a first optical block in which there is formed a first reflective plane and a second reflective plane, which are different in length, among four reflective planes constructing said two pairs of parallel planes which are different in length;

a second optical block in which there is formed a third reflective plane and a fourth reflective plane, which are different in length, among four reflective planes constructing said two pairs of parallel planes which are different in length; and wherein said first and second optical blocks are arranged in such a way that reflective planes of the same length face one another in parallel have the same shape, said first and second optical blocks being molded from one model.

12. A scanner optical system which conducts a light from a manuscript illuminated by a light source to image pickup means via a lens, said scanner optical system comprising:

a reflective optical unit composed of a plurality of four-plane reflective optical systems constructed in such a way that a luminous flux entering an area enclosed by two pairs of parallel planes is reflected at least once on each of said parallel planes and then the light exits;

wherein a light is conducted from said object to said lens via said reflective optical unit; and wherein said two pairs of parallel planes intersect at an angle of about 60° or 120°.

13. A reflective optical unit which has two pairs of parallel planes which are different in length, said reflective optical unit wherein light conducted into a medium area enclosed by said two pairs of parallel planes is reflected at least once on each of said parallel planes and then the light exits said medium area, wherein said two pairs of parallel planes intersect at an angle of about 60° or 120°.

14. The reflective optical unit as defined in claim 13, wherein reflective planes composing said two pairs of parallel planes are formed by one or more prism blocks.

15. The reflective optical unit as defined in claim 13, wherein said reflective optical unit is arranged between an object and a lens of a contracted optical system so as to secure a conjugate length specified by said lens, and an optical path for conducting light from said object to said lens is formed.

16. The reflective optical unit as defined in claim 15, wherein light from said object enters said medium area in proximity to a first edge where said two pairs of parallel planes intersect and exits an area in proximity to a second edge.

17. The reflective optical unit as defined in claim 15, wherein:

reflective planes composing said two pairs of parallel planes are formed by one prism block, and a light from said object enters a first edge where said two pairs of parallel planes intersect and exits a second edge where said two pairs of parallel planes intersect; and an incident plane, which is substantially vertical to an incident ray and is formed in such a size as not to interfere with reflection on each of said parallel planes, is formed in the area in proximity to said first edge, and/or an outgoing plane which is substantially vertical to an outgoing ray and is formed in such a size as not to interfere with reflection on each of said parallel planes, is formed in the area in proximity to said second edge.

18. A reflective optical unit which has two pairs of parallel planes which are different in length, said reflective optical unit wherein light conducted into a medium area enclosed by said two pairs of parallel planes is reflected at least once on each of said parallel planes and then the light exits said medium area, wherein reflective planes composing said two pairs of parallel planes are formed by one or more optical mirrors; and wherein said two pairs of parallel planes intersect at an angle of about 60° or 120°.

19. A reflective optical unit which has two pairs of parallel planes of different length and in which a light conducted into a medium area enclosed by said two pairs of parallel planes is reflected at least once on each of said parallel planes and then the light exits said medium area, said reflective optical unit wherein:

an incident part for capturing the light into said reflective optical unit is narrower than an outgoing opening through which the light exits said reflective optical unit; and wherein said two pairs of parallel planes intersect at an angle of about 60° or 120°.

20. The reflective optical unit as defined in claim 19, which is composed of prism blocks having two pairs of parallel planes, which are different in length, and an incident plane, which is substantially vertical to an incident ray, is formed as said incident part in an area in proximity to a first edge where said two pairs of parallel planes intersect, and an outgoing plane, which is substantially vertical to an outgoing ray, is formed as an outgoing part in said medium area in proximity to a second edge where said two pairs of parallel planes intersect.

21. The reflective optical unit as defined in claim 19, wherein reflective planes composing said two pairs of parallel planes are constructed by one or more optical mirrors, and a first opening is formed as said incident part in an area in proximity to a first edge where said two pairs of parallel planes intersect, and a second opening is formed as said outgoing opening in an area in proximity to a second edge where said two pairs of parallel planes intersect.

22. The reflective optical unit as defined in claim 19, further comprising at least one of a first aperture member with a slit for specifying said incident part and a second aperture member with a slit for specifying said outgoing part.

23. A scanner optical system which is provided with a reflective optical unit which has two pairs of parallel planes, said reflective optical unit being constructed in such a way that a light from a manuscript illuminated by a light source is reflected at least once on each of said parallel planes and then the light exits, said scanner optical system conducting the light from said reflective optical unit to image pickup means via a lens, said scanner optical system wherein:

at least one of reflective planes constructing said parallel planes is formed by one or more optical blocks made of transparent optical material, and a lens support member for supporting said lens is integrated with said optical block; and wherein said two pairs of parallel planes intersect at an angle of about 60° or 120°.

* * * * *